(12) United States Patent
Ryu

(10) Patent No.: US 9,009,433 B2
(45) Date of Patent: Apr. 14, 2015

(54) METHOD AND APPARATUS FOR RELOCATING DATA

(75) Inventor: In Sik Ryu, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 128 days.

(21) Appl. No.: 13/458,977

(22) Filed: Apr. 27, 2012

(65) Prior Publication Data

US 2013/0117520 A1    May 9, 2013

(30) Foreign Application Priority Data

Apr. 27, 2011  (KR) ........................ 10-2011-0039712

(51) Int. Cl.
| | | |
|---|---|---|
| G06F 12/00 | (2006.01) | |
| G06F 13/00 | (2006.01) | |
| G06F 13/28 | (2006.01) | |
| G06F 12/02 | (2006.01) | |
| G06F 3/06 | (2006.01) | |
| G11B 5/012 | (2006.01) | |
| G11B 20/10 | (2006.01) | |

(52) U.S. Cl.
CPC  *G06F 12/02* (2013.01); *G06F 3/06* (2013.01); *G06F 3/0608* (2013.01); *G06F 3/064* (2013.01); *G06F 3/0676* (2013.01); *G11B 5/012* (2013.01); *G11B 2020/10898* (2013.01)

(58) Field of Classification Search
CPC ................... G06F 12/0253; G06F 2212/7205; G06F 12/023; G06F 2212/7201; G06F 3/064; G06F 3/061; G06F 3/0676
USPC ................................................. 711/165, 170
See application file for complete search history.

(56) References Cited

U.S. PATENT DOCUMENTS

| | | |
|---|---|---|
| 7,440,221 B2 | 10/2008 | Tsuchinaga |
| 7,982,994 B1 | 7/2011 | Erden |
| 8,179,627 B2 | 5/2012 | Chang |
| 8,270,256 B1 | 9/2012 | Juang |
| 8,443,167 B1 * | 5/2013 | Fallone et al. ................ 711/206 |
| 2002/0166022 A1 * | 11/2002 | Suzuki .......................... 711/103 |
| 2005/0071537 A1 * | 3/2005 | New et al. .................... 711/100 |
| 2007/0030588 A1 | 2/2007 | Tsuchinaga |

(Continued)

OTHER PUBLICATIONS

Garth Gibson, Directions for Shingled-Write and Two-Dimensional Magnetic Recording System Architectures: Synergies with Solid-State Disks, Carnegie Mellon University, May 2009,pp. 1-2, Pittsburgh, US.

*Primary Examiner* — Charles Rones
*Assistant Examiner* — Sidney Li
(74) *Attorney, Agent, or Firm* — Cesari & Reed LLP; Kirk A. Cesari; Christian W. Best

(57) ABSTRACT

Disclosed are an apparatus and method for recycling areas of a data storage device by relocating data. In one embodiment, a method may comprise selecting a first storage area based on a quantity of obsolete data in the first storage area, moving valid data from the first storage area to a second storage area, and setting memory spaces corresponding to the first storage area as available memory for storing other data. Another embodiment may further comprise selecting a physical address-based move operation or a logical address-based move operation based on a number of sets of contiguous valid memory spaces in the first storage area, wherein the physical address-based move comprises moving data based on physical data addresses, and logical address-based moved comprises moving data based on logical block addresses.

18 Claims, 34 Drawing Sheets

(56) References Cited

U.S. PATENT DOCUMENTS

| | | | |
|---|---|---|---|
| 2011/0055471 A1* | 3/2011 | Thatcher et al. | 711/114 |
| 2011/0058277 A1* | 3/2011 | de la Fuente et al. | 360/122 |
| 2011/0085266 A1 | 4/2011 | Kanai | |
| 2011/0222186 A1 | 9/2011 | Itakura | |
| 2011/0283049 A1* | 11/2011 | Kang et al. | 711/103 |
| 2011/0292545 A1 | 12/2011 | Katada | |
| 2012/0060073 A1 | 3/2012 | Itakura | |
| 2012/0069466 A1 | 3/2012 | Okamoto | |
| 2012/0082019 A1 | 4/2012 | Harigae | |
| 2012/0099216 A1 | 4/2012 | Grobis | |
| 2012/0162808 A1 | 6/2012 | Masuda | |
| 2012/0194937 A1 | 8/2012 | Tagami | |
| 2012/0303928 A1* | 11/2012 | Hall | 711/172 |

\* cited by examiner

Start PBA0  SOURCE AREA

End PBA 199

Address Mapping Information

| LBA | Scts | PBA |
|---|---|---|
| 0 | 10 | 0 |
| 20 | 2 | 15 |
| 22 | 20 | 106 |
| 50 | 10 | 38 |
| 60 | 20 | 179 |
| 80 | 20 | 154 |
| 100 | 20 | 86 |

Address mapping information after PBA sorting

| LBA | Scts | PBA |
|---|---|---|
| 0 | 10 | 0 |
| 20 | 2 | 15 |
| 50 | 10 | 38 |
| 100 | 20 | 86 |
| 22 | 20 | 106 |
| 80 | 20 | 154 |
| 60 | 20 | 179 |

Address Mapping Information

| LBA | Scts | PBA |
|---|---|---|
| 0 | 10 | 0 |
| 20 | 2 | 10 |
| 50 | 10 | 12 |
| 100 | 20 | 22 |
| 22 | 20 | 42 |
| 80 | 20 | 62 |
| 60 | 20 | 82 |

Address Mapping Information

| LBA | Scts | PBA |
|-----|------|-----|
| 0   | 10   | 0   |
| 20  | 26   | 10  |
| 46  | 5    | 95  |
| 70  | 2    | 68  |
| 82  | 7    | 106 |
| 101 | 9    | 163 |

FIG. 15B

| LBA0 Scts10 PBA0 | 59 | 6 | PBA 171 | LBA101 Scts9 PBA163 |
|---|---|---|---|---|

FIG. 15C

Address Mapping Information

| LBA | Scts | PBA |
|---|---|---|
| 0 | 10 | 0 |
| 20 | 26 | 10 |
| 46 | 5 | 36 |
| 70 | 2 | 41 |
| 82 | 7 | 43 |
| 101 | 9 | 50 |

Address mapping information merged

Address Mapping Information

| LBA | Scts | PBA |
|-----|------|-----|
| 0 | 10 | 0 |
| 20 | 31 | 10 |
| 70 | 2 | 41 |
| 82 | 7 | 43 |
| 101 | 9 | 50 |

FIG. 15F

| LBA0 Scts10 PBA0 | 59 | 5 | PBA 58 | LBA101 Scts9 PBA50 |
|---|---|---|---|---|

FIG. 15G

Address Mapping Information

| | LBA | Scts | PBA |
|---|-----|------|-----|
| 1601 { | 0 | 10 | 0 |
| | 20 | 2 | 15 |
| | 50 | 10 | 38 |
| | 100 | 20 | 86 |
| | 22 | 8 | 106 |
| 1602 { | 30 | 12 | 114 |
| | 80 | 20 | 154 |
| | 60 | 20 | 179 |

← Split Mapping Information Generated

FIG. 16A

Address Mapping Information

| LBA | Scts | PBA | |
|-----|------|-----|---|
| 0   | 10   | 0   | |
| 20  | 2    | 10  | |
| 50  | 10   | 12  | |
| 100 | 20   | 22  | |
| 22  | 8    | 42  | |
| 30 | 12 | 50 | 5' |
| 80  | 20   | 62  | |
| 60  | 20   | 82  | |

FIG. 16D

Address Mapping Information

| LBA | Scts | PBA |
|-----|------|-----|
| 0   | 10   | 0   |
| 20  | 2    | 10  |
| 50  | 10   | 12  |
| 100 | 20   | 22  |
| 22  | 20   | 42  |
| 80  | 20   | 62  |
| 60  | 20   | 82  |

FIG. 16E

Split Mapping Information Generated

Address Mapping Information

| LBA | Scts | PBA |
|---|---|---|
| 2 | 100 | 0 |
| 1' 102 | 4 | 100 |
| 129 | 12 | 104 |

Address Mapping Information Merged

FIG. 17F

Address Mapping Information

| LBA | Scts | PBA |
|---|---|---|
| 2 | 104 | 0 |
| 129 | 12 | 104 |

FIG. 17G

METHOD AND APPARATUS FOR RELOCATING DATA

CROSS-REFERENCE TO RELATED APPLICATION

This application claims priority under 35 U.S.C. §119(a) of Korean Patent Application No. 2011-0039712, filed on Apr. 27, 2011, the entire disclosure of which is hereby incorporated by reference.

BACKGROUND OF THE INVENTION

1. Field of the Invention

Embodiments of the present invention relate to controlling a write operation on a storage medium, and more particularly, to controlling a write operation on a storage medium capable of merging data written on a storage medium.

2. Background of the Invention

A storage device which is connectable to a host device may write data on a storage medium or read data from the storage medium according to a command transmitted from the host device. As storage mediums tend to have high capacity and high density, various write techniques have been studied to enhance a record density.

SUMMARY OF THE INVENTION

In one embodiment, a method may comprise selecting a first data storage area of a data storage medium, the first data storage area having obsolete data and first valid data, the first data storage area selected based on a quantity of obsolete data in the first data storage area; moving the first valid data to a second data storage area; and setting memory spaces corresponding to the first data storage area as available memory for storing other data.

In another embodiment, an apparatus an apparatus may comprise a data storage device including a storage medium, a processor configured to select a first data storage area of the storage medium, the first data storage area having obsolete data and first valid data, the first data storage area selected based on a quantity of obsolete data in the first data storage area, move the first valid data to a second data storage area, and set memory sectors corresponding to the first data storage area as available memory for storing other data.

In another embodiment, an apparatus may comprise a controller configured to select a first data storage area of a data storage medium, the first data storage area having obsolete data and first valid data, the first data storage area selected based on a quantity of obsolete data in the first data storage area; move the first valid data to a second data storage area; and set memory sectors corresponding to the first data storage area as available memory for storing other data.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

An aspect of the invention embodiments is to provide a method for merging data written in a storage medium capable of merging data written in a storage medium according to a selected merge operation on the basis of write state information of the storage medium. Another aspect of the invention embodiments is to provide a method for controlling a write operation on a storage medium capable of writing data on or to a storage medium such that data written on the storage medium is merged according to a selected merge operation on the basis of write state information of the storage medium. Further scope of applicability of the present application will become more apparent from the detailed description given hereinafter. However, it should be understood that the detailed description and specific examples, while indicating some embodiments of the invention, are given by way of illustration only, since various changes and modifications within the scope of the invention will become apparent to those skilled in the art from the detailed description.

Description will now be given in detail of the exemplary embodiments, with reference to the accompanying drawings to sufficiently understand the present invention, operational advantages of the present invention, and the objects achieved by the embodiments of the present invention.

Preferred embodiments of the present invention will be described with reference to the drawings, and the same or equivalent components will be provided with the same reference numbers.

Figure 1A:
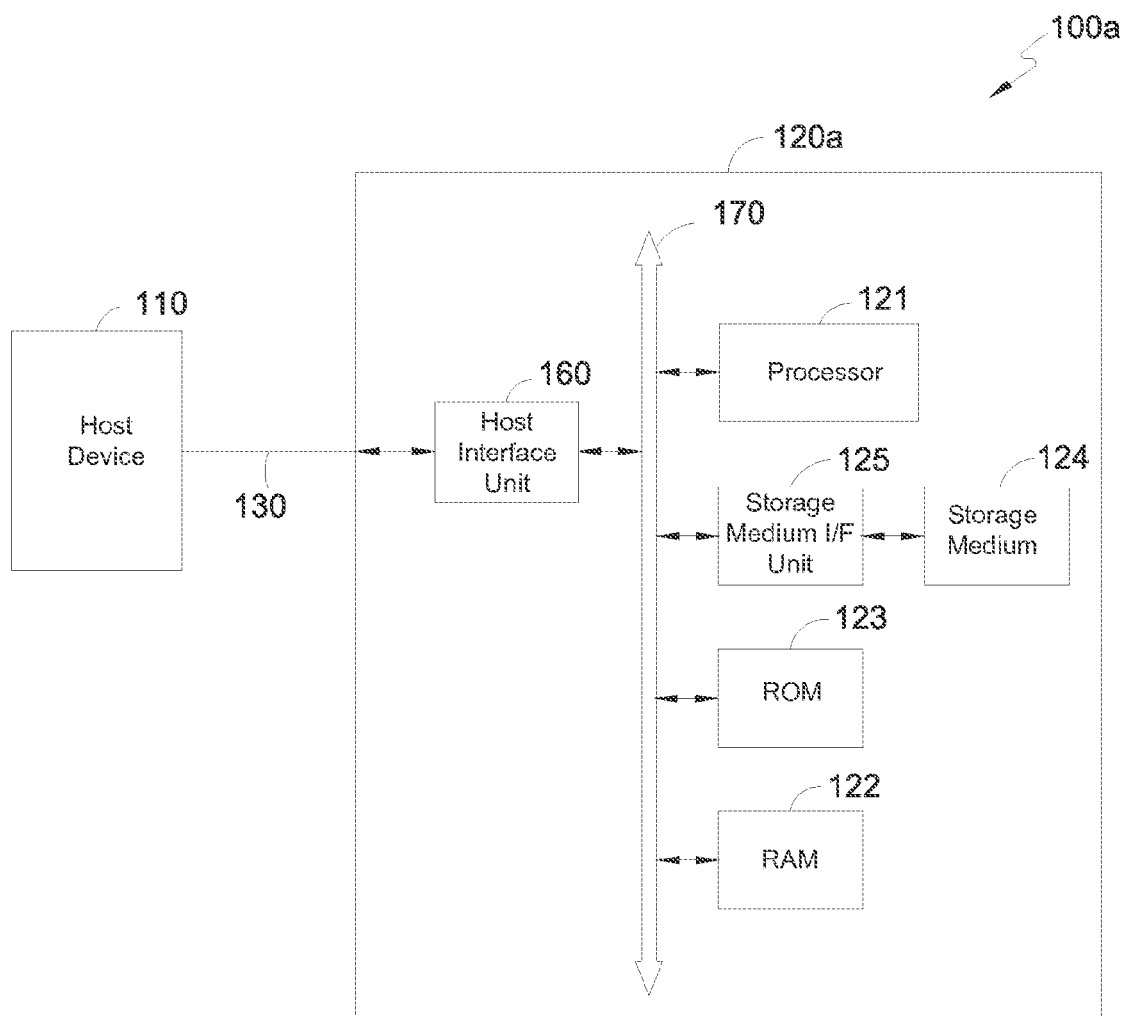
FIG. 1a is a functional block diagram of a host device-storage device-based system according to a preferred embodiment of the present invention.

FIG. 1a is a functional block diagram of a host device-storage device-based system according to a preferred embodiment of the present invention. The host device-storage device-based system 100a may be referred to as a computer system but is not limited thereto.

With reference to FIG. 1a, the host device-storage device-based system 100a includes a host device 110, a storage device 120a, and a communication link 130.

The host device 110 may generate a command for operating the storage device 120a and transmit the generated command to the storage device 120a connected through the communication link 130, and transmit data to the storage device 120a or perform an operation or process of receiving data from the storage de ice 120a according to the generated command.

The host device 110 may be a device, a server, a digital camera, a digital media player, a set-top box, a processor, a field programmable gate array, a programmable logic device, and/or a certain suitable electronic device. The host device 110 may be a single body with the storage device 120a.

The communication link 130 may be configured to connect the host device 110 and the storage device 120a by a wire communication link or a wireless communication link.

When the host device 110 and the storage device 120a are connected by a wire communication link, the communication link 130 may be configured as a connector electrically connecting an interface port of the host device 110 and an interface port of the storage device 120a. The connector may include a data connector and a power connector. For example, when a SATA (Serial Advanced Technology Attachment) interface is used between the host device 110 and the storage device 120a, a connector may include a 7-pin SATA data connector and a 15-pin SATA power connector.

When the host device 110 and the storage device 120a are connected by a wireless communication link, the communication link 130 may be configured on the basis of wireless communication such as Bluetooth or Zigbee.

The storage device 120a may write data received from the host device 110 to the storage medium 124 according to a command received from the host device 110 or transmit data read from the storage medium 124 to the host device 110. The storage device 120 may be referred to as a data storage device, a disk driver, a disk system, or a memory device. When data is written on the storage medium 124 on the basis of a shingled write operation as described hereafter, the storage medium 124 may be referred to as a shingled write disk system or a shingled magnetic recording system.

With reference to FIG. 1a, the storage device 120a may include a processor 121, a RAM (Random Access Memory) 122, A ROM (Read Only Memory) 123, a storage medium 124, a storage medium interface unit 125, a bus 126, and a host interface 127, but is not limited thereto. Namely, the storage device 120a may be configured by greater components than those illustrated in FIG. 1a or may be configured by fewer components than those illustrated in FIG. 1a.

The processor 121 may interpret a command received from the host device 110 through the host interface unit 127 and the bus 126, and control components of the storage device 120a according to the interpretation results. The processor 121 may include a code object management unit. The processor 121 may load a code object stored in the storage medium 124 to the RAM 122 by using the code object management unit. For example, the processor 121 may load code objects for executing the method for merging data written on the storage medium 124 according to the flow charts of FIGS. 19 to 23, FIGS. 27 to 29, and FIG. 31 as described hereafter stored in the storage medium 124 and the method for controlling a write operation on the storage medium 124 according to the flow charts FIGS. 24 and 25 to the RAM 122.

Figure 22:
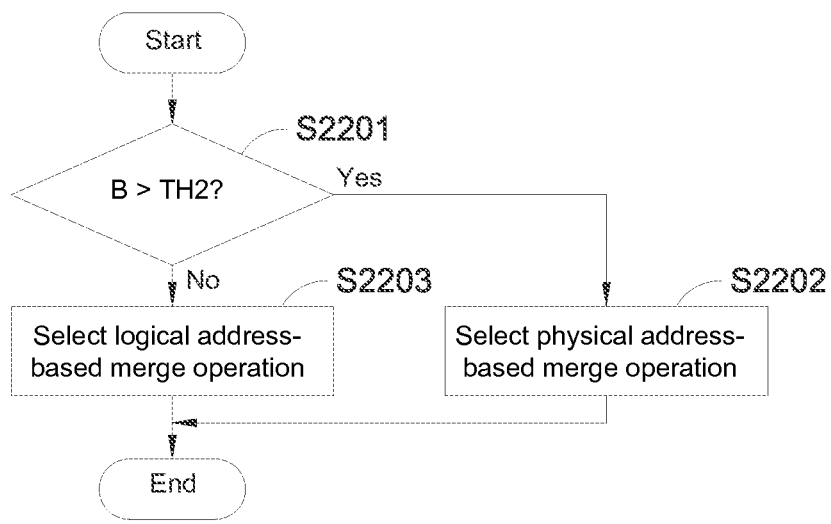
FIG. 22 is a view showing another example of a flow chart of an operation regarding a selection of a merge operation illustrated in FIG. 19.
Figure 23:
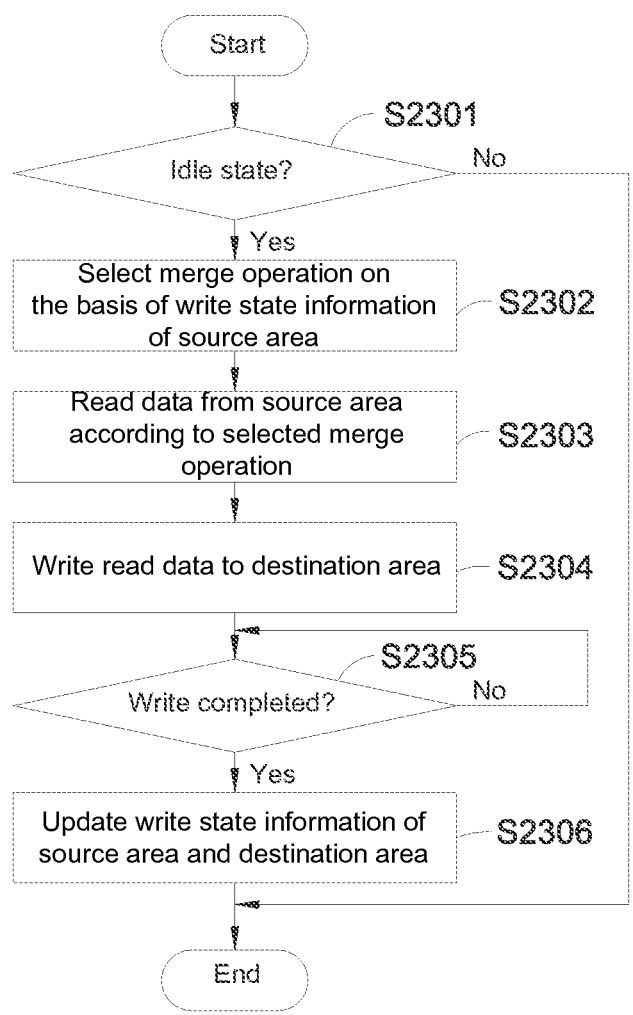
FIG. 23 is a view showing another example of a flow chart of an operation of a method of merging data written in a storage medium according to an embodiment of the present invention.
Figure 24:
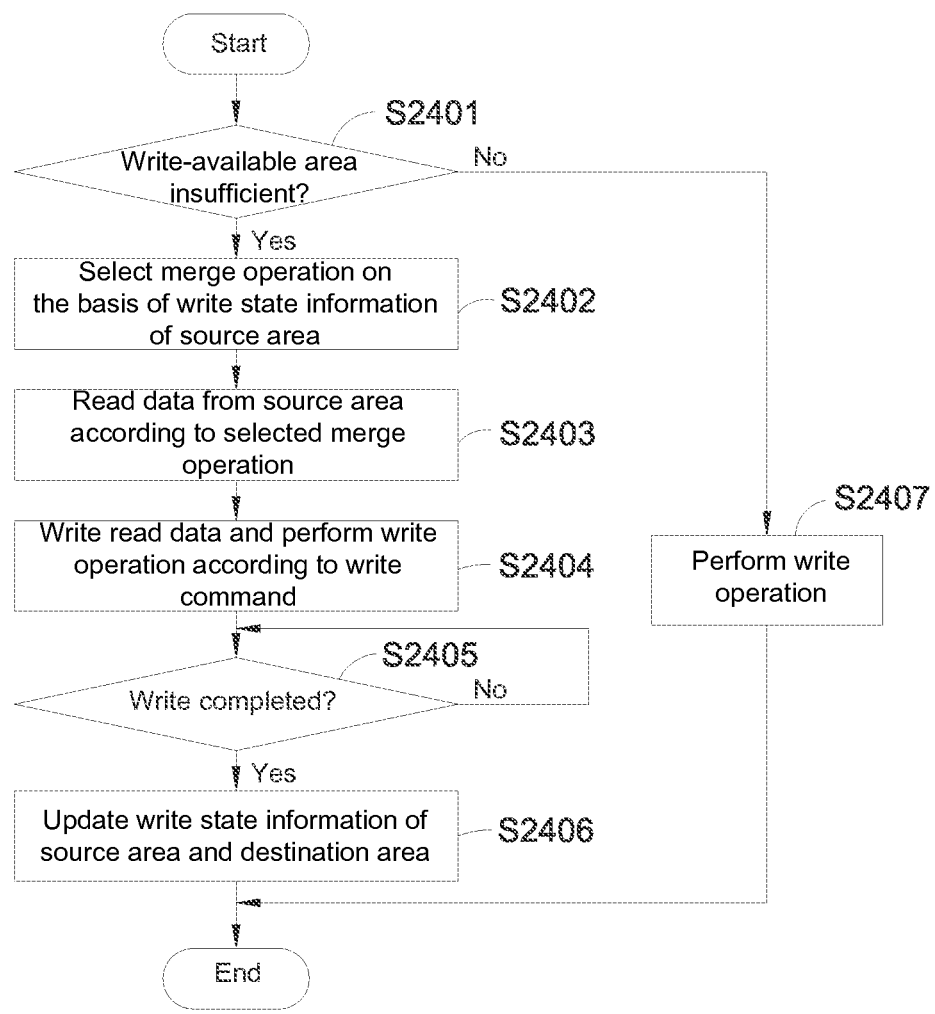
FIG. 24 is a flow chart of an operation regarding a method for controlling a write operation on a storage medium according to another embodiment of the present invention.
Figure 25:
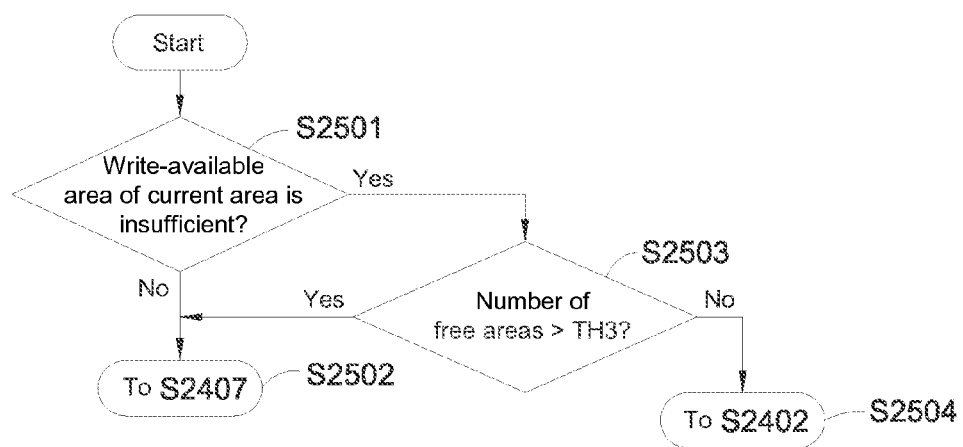
FIG. 25 is a view showing an example of a detailed flow chart of an operation for determining whether a write-available area illustrated in FIG. 24 is insufficient.

The processor 121 may execute tasks regarding the method for merging data written on the storage medium 124 according to the flow charts of FIGS. 19 to 23, FIGS. 27 to 29, and FIG. 31 and the method for controlling a write operation on the storage medium 124 according to the flow charts FIGS. 24 and 25 by using the code objects loaded to the RAM 122. The method for merging data written on the storage medium 124 executed by the processor 121 and the method for controlling a write operation on the storage medium 124 will be described with reference FIGS. 19 to 25, FIGS. 27 to 29, and FIG. 31

The ROM may store a program code and data required for operating the storage device 120. The program code and data stored in the ROM 123 may be loaded under the control of the processor 121. The program code and data stored in the ROM 123 may include write state information of each area of the storage medium 124 used in an embodiment of the present invention.

The write state information may include a mapping table including address mapping information obtained by mapping physical addresses (PA) of the disk 12 and logical addresses (LA) included in a host command and an SAT (Sector Allocation Table) referred to in detail in FIGS. 14 and 15 as described later. Namely, the write state information may include information regarding a write state such as the number of sectors in which valid data is written in each area, the foregoing address mapping information of the valid sector, the number of invalid sectors, and the like. The write state information may be referred to as meta-data of the disk 12 or data included in the meta-data. The foregoing area may be interpreted as one corresponding to a band referred to in FIG. 7 as described later, but not limited thereto. The write state information stored in the ROM 123 may be loaded to the RAM 122 and used under the control of the processor 121.

In case of a shingled write disk in which data is written in one direction while overlapping in a partial area of a previous track, the foregoing address mapping information may be address mapping information obtained by mapping virtual addresses (VA) on the basis of a physical position of the disk 12 and logical addresses included in the host command received from the host device 110. The virtual addresses may be referred to as virtual block addresses (VBA). The logical addresses may be referred to as logical block addresses (LBA), and the physical addresses may be referred to as physical block addresses (PBA). The shingled write disk will be described in detail with reference to FIGS. 7, 8a and 8b as described hereafter.

The ROM 123 may store a program code for executing the method for merging data written in a storage medium 124 and a method for controlling a write operation on the storage medium 124 illustrated in FIGS. 19 to 25, FIGS. 27 to 29, and FIG. 31. The program code for executing the methods stored in the ROM 123 may be loaded to the RAM 122 and used.

The RAM 122 and the ROM 123 may be referred to as a single information storage unit.

The storage medium 124 is a main storage medium of the storage device 120a, and a disk or a non-volatile memory element may be used as the storage medium 124. As mentioned above, the storage medium 124 may store code objects for executing the method for merging data written in a storage medium 124 according to the flow charts of FIGS. 19 to 23, FIGS. 27 to 29 and FIG. 31 and a method for controlling a write operation on the storage medium 124 illustrated in FIGS. 24 and 25, and data such as the foregoing write state information.

Figure 2:
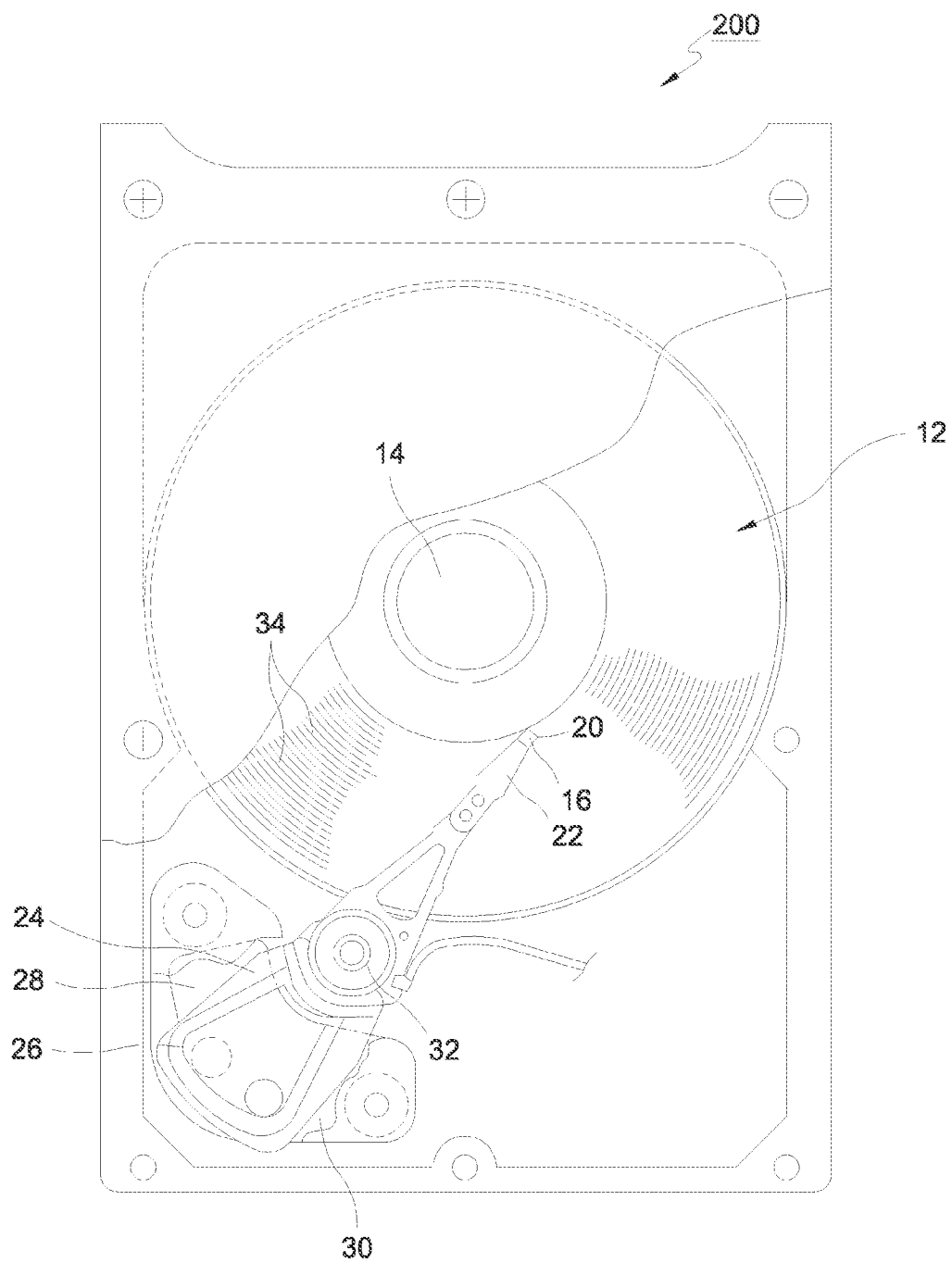
FIG. 2 is a plan view of a head disk assembly when a storage device illustrated in FIG. 1a is a disk drive.

When the storage device 120a is a disk drive, the head disk assembly 200 may be defined as shown in FIG. 2.

FIG. 2 is a plan view of the head disk assembly 200 when the storage device 120a is a disk drive. With reference to FIG. 2, the head disk assembly 200 includes at least one disk 12 rotated by a spindle motor 14. The disk 12 should be interpreted to correspond to the storage medium 124 in FIG. 1a. The head disk assembly 200 includes a head 16 positioned to be adjacent to a surface of the disk 12.

The head 16 senses a magnetic field of the disk 12 and magnetizes the disk 12 to read data from the rotating disk 12 or write data to the disk 12. In general, the head 16 is coupled to the surface of the disk 12. FIG. 2 illustrates a single head 16, but should be interpreted to include a writing head for magnetizing the disk 12 and a reading head for sensing a magnetic field of the disk 12. The reading head may be configured from a magneto-resistive (MR) element. The head 16 may be referred to as a magnetic head or a transducer.

The header 16 may be integrated into a slider 20. The slider 20 may be configured to have a structure for generating air bearing between the head 16 and the surface of the disk 12. The slide 20 is coupled t a head gimbal assembly 22. The head gimbal assembly 22 is attached to an actuator arm 24 having a voice coil 26. The voice coil 26 is positioned is positioned to be adjacent to a magnetic assembly 28 to specify a voice coil motor (VCM) 30. A current supplied to the voice coil 26 generates a torque that rotates an actuator arm 24 with respect to the bearing assembly 32. The rotation of the actuator arm 24, traversing the surface of the disk 12, moves the head 26.

Data is written in a track 34 configured as a single circle in the disk 12. Each track 34 includes a plurality of sectors. Sectors included in each track may be configured as shown in FIG. 3.

Figure 3:
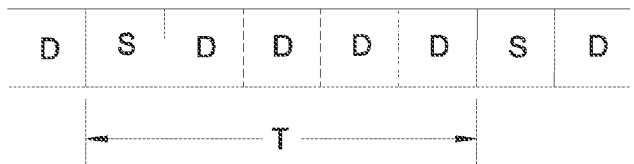
FIG. 3 is a view showing an example of a sector structure with respect to one track of a disk applicable to preferred embodiments of the present invention.

FIG. 3 shows an example of a sector structure of one track of the disk 12. With reference to FIG. 3, a single servo sector section T may include a servo area S and a plurality of data sectors D. However, the track may be configured such that a single data sector D is included in a single servo sector section T. The data sector D may be referred to as a sector. Signals illustrated in FIG. 4 may be specifically written in the servo area S. The servo sector section T may be referred to as a servo frame section.

Figure 4:
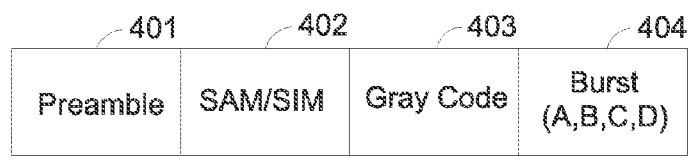
FIG. 4 is a view showing an example of a structure with respect to a servo information area illustrated in FIG. 3.

FIG. 4 is a view showing an example of the structure of the servo area S illustrated in FIG. 3. With reference to FIG. 4, a preamble 401, a servo synchronization representation signal 402, a gray code 403, an burst signals 404 are written in the servo area S. The preamble 401 provides clock synchronization when servo information is read, provides a gap before a servo sector to provide a certain timing margin, and may be used for determining a gain of an auto gain control circuit.

The servo synchronization representation signal 402 includes a servo address mask (SAM) and a servo index mark (SIM). The servo address mark is a signal indicating a start of a servo sector. The servo index mark is a signal indicating a start of a first servo sector.

The gray code 403 provides track information. The burst signal 404 is a signal used to control the head 16 to follow the center of the track 34. For example, the burst signal 404 may include four patterns A, B, C, and D. Namely, the four burst patterns may be combined to generate a position error signal used to control track following.

The disk 12 may be divided into a maintenance cylinder area a user cannot access and a user data area the user can access. The maintenance cylinder area may be referred to as a system area. Various types of information required for controlling the disk drive are stored in the maintenance cylinder area. Information required for performing the method for merging data written on the storage medium 124 and the method for controlling a write operation on the storage medium 124 according to preferred embodiments of the present invention are stored in the maintenance cylinder area. For example, write state information mentioned in the preferred embodiments of the present invention may be stored in the maintenance cylinder area.

The head 16 may move to traverse the surface of the disk 12 to read data of a different track or write data to a different track. A plurality of code objects for implementing various functions by using the disk drive may be stored in the disk 12. For example, a code object for performing an MP3 player function, a code object for performing a navigation function, a code object for performing various video games, and the like, may be stored in the disk 12.

With reference to FIG. 1a, the storage medium interface unit 125 is an element allowing the processor 121 to access the storage medium 124 to write data or read data. When the storage device 120a is a disk drive, the storage medium interface unit 125 may include a servo circuit for controlling the head disk assembly 200 and a read/write channel circuit for performing signals for reading and/or writing data.

The host interface unit 127 in FIG. 1a may perform data transmission and/or reception between the host device 110 and the storage device 120. The host interface unit 127 may be configured on the basis of the communication link 130.

The bus 126 may transfer information between the elements of the storage device 120a.

Figure 5:
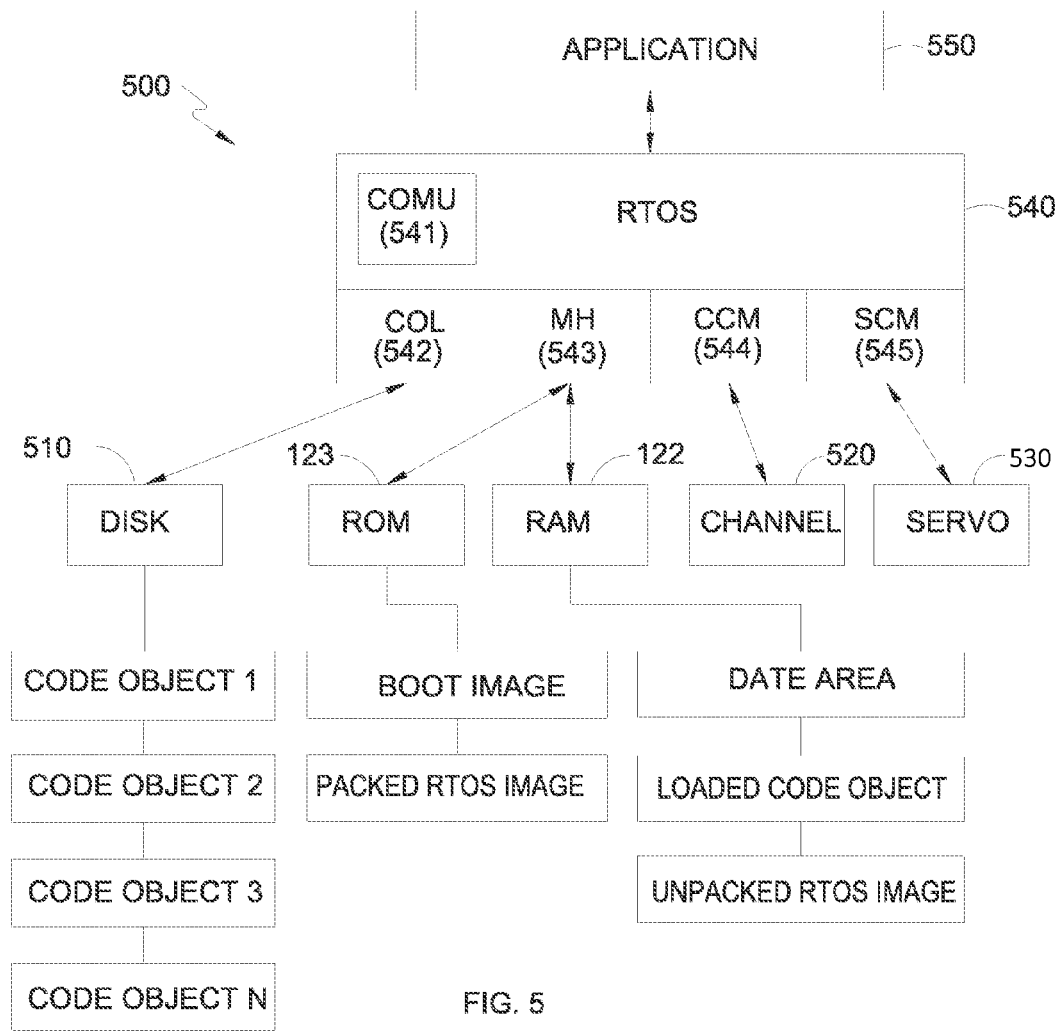
FIG. 5 is a view for explaining a software operating system when the storage device of FIG. 1a is a disk drive.

When the storage device 120a is a disk drive, a software operating system of the storage device 120a may be defined as shown in FIG. 5. FIG. 5 is a view for explaining a software operating system when the storage device 120a is a disk drive.

With reference to FIG. 5, a plurality of code objects (1~N) are stored in the disk 510 corresponding to the storage medium 124. The code objects written in the disk 510 may include code objects required for operating the disk drive and code objects in relation to various functions using the disk drive.

In particular, in order to execute the preferred embodiments of the present invention, code objects for executing the method for merging data written in a storage medium 124 according to the flow charts of FIGS. 19 to 23, FIGS. 27 to 29 and FIG. 31 and the method for controlling a write operation on the storage medium 124 illustrated in FIGS. 24 and 25 may be written to the disk 510. The code objects for executing the method for merging data written in a storage medium 124 according to the flow charts of FIGS. 19 to 23, FIGS. 27 to 29 and FIG. 31 and the method for controlling a write operation on the storage medium 124 illustrated in FIGS. 24 and 25 may be stored in the ROM 123 instead of the disk 510. The code objects performing various functions such as the MP3 player function, the navigation function, the video game function, and the like, may also be stored in the disk 510.

A boot image and a packed RTOS image are stored in the ROM 123 in FIG. 1a. An RTOS image unpacked by reading the boot image from the ROM 123 during a booting process is loaded to the RAM 122. The code objects stored in the disk 510 and required to perform host interfacing are loaded to the RAM 122. A data area for storing data is also allocated to the RAM.

Circuits required for performing signals for reading and/or writing data are installed in a channel circuit 520. Circuits required for controlling the head disk assembly 200 to performing a data read operation or a data write operation are installed in a servo circuit 530.

An RTOS (Real Time Operating System) 540 is a real time operating system program, which is a multi-program operating system using the disk 510. According to tasks, the RTOS performs real time multi-processing at a foreground having high priority and performs collective processing at a background having low priority. The RTOS 540 may perform code object loading from the disk 510 or performing code project unloading to the disk 510.

The RTOS 540 manages a code object management unit (COMU) 541, a code object loader (COL) 542, a memory handler (MH) 543, a channel control module (CCM) 544, and a servo control module (SCM) 545 to execute a task according to a requested command. The RTOS 540 also manages application programs 550.

The RTOS 540 loads code objects required for controlling the disk drive during the booting process of the disk drive to the RAM 122. Thus, when the booting process is executed, the disk 510 can be operated by using the code objects loaded to the RAM 122. Also, when the disk 510 is a shingled write disk, the RTOS 540 may be operated on the basis of an HTL (HDD Translation Layer) to be mentioned in FIGS. 7, 8a, and 8b as described hereinafter.

The COMU 541 stores position information in which the code objects are written and mediates the bus 126. Also, the COMU 541 stores information regarding priority of the tasks being executed. Also, the COMU 541 manages task control block (TCB) information and stack information required for performing task with respect to code objects.

The COL 542 serves to load the code objects stored in the disk 510 to the RAM 122 by using the COMU 541 or unload the code objects stored in the RAM 122 to the disk 510. Accordingly, the COL 541 may load the code objects for executing the method for merging data written on the storage medium 124 according to the flow charts of FIGS. 19 to 23, FIGS. 27 to 29, and FIG. 31 as described hereafter and the method for controlling a write operation on the storage medium 124 according to the flow charts FIGS. 24 and 25 stored in the disk 510 to the RAM 122.

The RTOS 540 may execute the method according to the flow charts of FIGS. 19 to 25, FIGS. 27 to 29, and FIG. 31 which will be described hereafter by using the code objects loaded to the RAM 122.

The MH 543 writes or reads data to or from the ROM 123 and the RAM 122. The CCM 544 performs channel controlling required for performing signal processing to read and write data. The SCM 545 performs servo controlling including the head disk assembly 200 to perform reading and writing data.

Figure 1B:
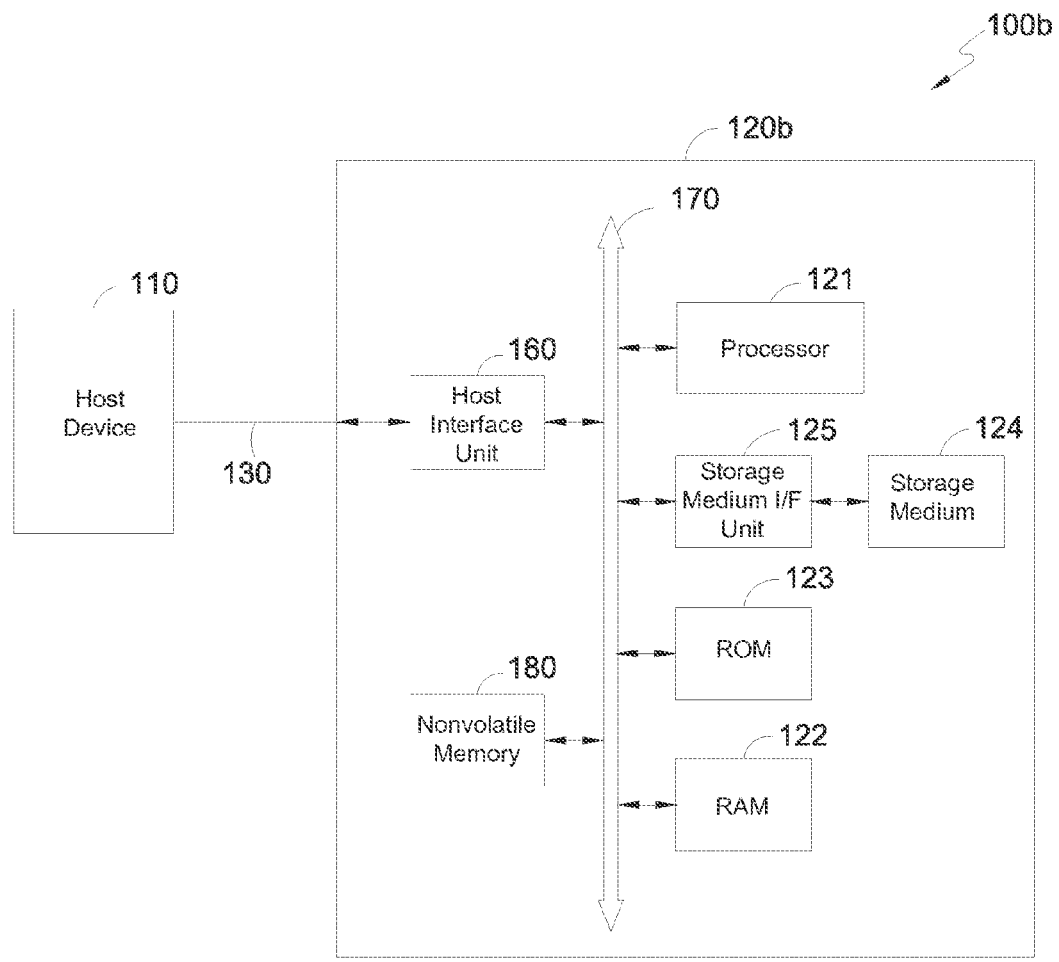
FIG. 1b is a functional block diagram of a host device-storage device-based system according to another preferred embodiment of the present invention.

Meanwhile, FIG. 1b is a functional block diagram on the basis of a host device-storage device 100b according to another preferred embodiment of the present invention.

With reference to FIG. 1b, a storage device 120b is configured by adding a nonvolatile memory 128 to the storage device 120a of FIG. 1a. In FIG. 1b, the storage medium 124 may be implemented as a disk.

The nonvolatile memory 128 may be implemented as a nonvolatile semiconductor memory, and for example, the nonvolatile memory 128 may be implemented as a flash memory, a PRAM (Phase change RAM), an FRAM (Ferroelectric RAM), a MRAM (Magnetic RAM), or the like.

The nonvolatile memory 128 may store a portion or the entirety of data desired to be stored in the storage device 120b. For example, various types of information required for controlling the storage device 120b may be stored in the nonvolatile memory 128.

The nonvolatile memory 128 may store program codes for executing the method according to the flow charts of FIGS. 19 to 25, FIGS. 27 to 29, and FIG. 31 and information. In detail, a mapping table for converting logical block addresses into virtual addresses on the basis of a virtual zone or a virtual band may be stored in the nonvolatile memory 128. Also, code objects for implementing various functions of the storage device 120b may be stored in the nonvolatile memory 128. When the mapping table is stored in the nonvolatile memory 128, the storage device 120b may load the mapping table stored in the nonvolatile memory 128 to the RAM 122.

Figure 6A:
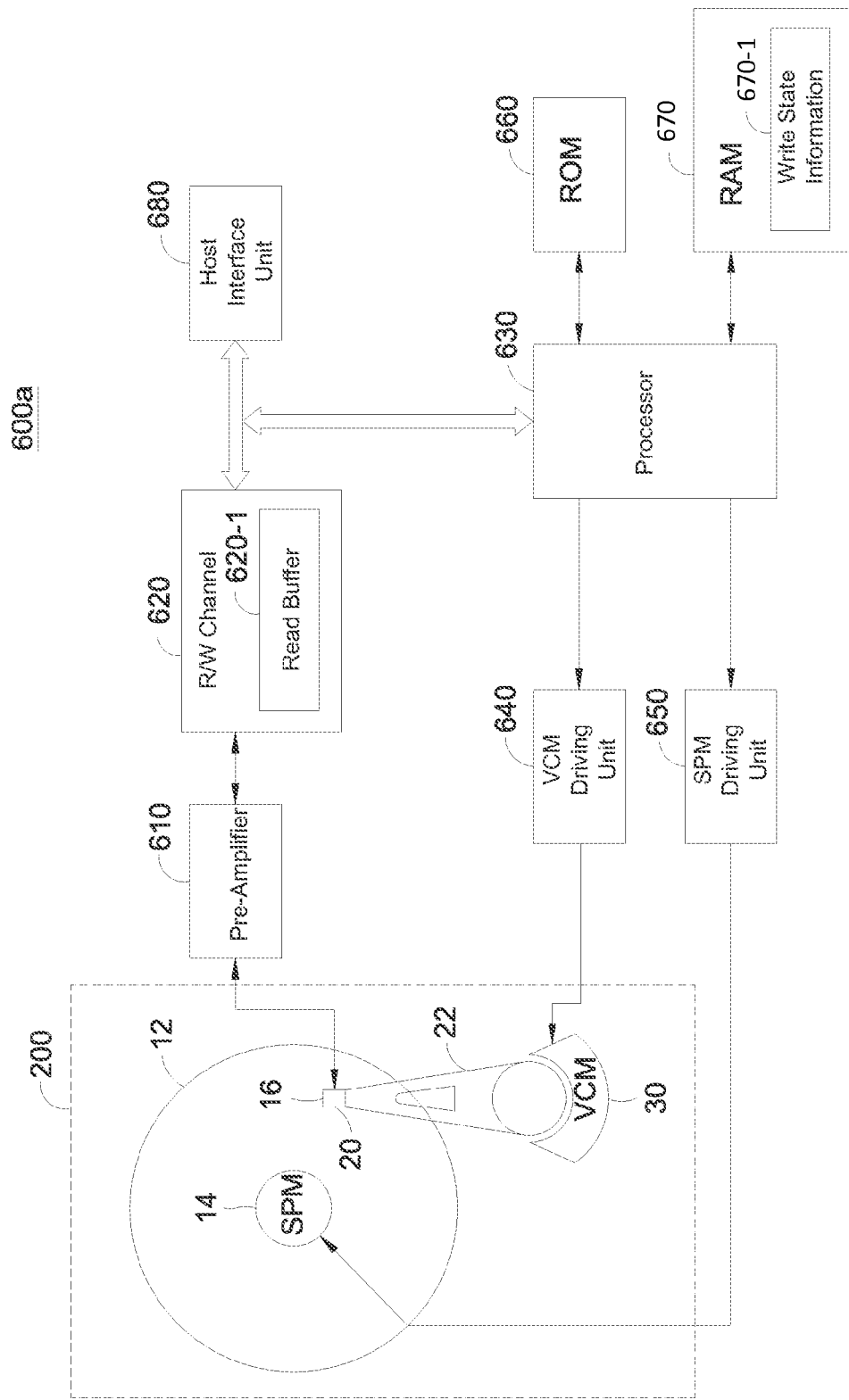
FIG. 6a is an electrical function block diagram of a storage device when the storage device of FIG. 1a is a disk drive.

A repeated description of the same elements as described above in the host device-storage device 100a-based system will be omitted. FIG. 6a is an electrical functional block diagram of the storage device 120a when the storage device 120a of FIG. 1a is a disk drive.

With reference to FIG. 6a, a disk drive 600a as an embodiment of the storage device 120a includes a head disk assembly 200, a pre-amplifier 610, a read/write channel (R/W channel) 620, a processor 630, a voice coil motor (VCM) driving unit 640, a spindle motor (SPM) driving unit 650, a ROM 660, a RAM 670, and a host interface unit 680. The configuration of the disk drive 600a is not limited to the configuration illustrated in FIG. 6a.

The processor 630 may be configured as a digital signal processor (DSP), a microprocessor, a microcontroller, and the like, but not limited thereto. The processor 630 controls the read/write channel 620 in order to read data from the disk 12 or write data to the disk 12 according to a command received from the host device 110 through the host interface unit 680. The read/write channel 620 may include a read buffer 620-1 used to read data from the disk 12. However, the processor 630 may directly perform an operation corresponding to the read buffer 620-1 or may perform an operation corresponding to the read buffer 620-1 by using the RAM 670.

The processor 630 is coupled to the VCM driving unit 640 for supplying a driving current for driving the VCM 30. The processor 630 may supply a control signal to the VCM driving unit 640 in order to control a movement of the head 16.

The processor 630 is coupled to the SPM driving unit 650 supplying a driving current for driving the SPM 14. When power is supplied, the processor 630 may provide a control signal to the SPM driving unit 650 in order to rotate the SPM 14 at a target speed.

The processor 630 is coupled to the ROM 660 and the RAM 670. The ROM stores firmware for controlling the disk drive 600a and control data. Program codes for executing the method according to the flow charts of FIGS. 19 to 25, FIGS. 27 and 28, and FIG. 31 and information may be stored in the ROM 660 or in a maintenance cylinder area of the disk 12.

In an initialization mode, program codes stored in the ROM 660 or the disk 12 may be loaded to the RAM 670 under the control of the processor 630. Data received through the host interface unit 680 or data read from the disk 12 may be temporarily stored in the RAM 670. Thus, the RAM 670 may be used as an element corresponding to the read buffer 620-1 as described above.

Write state information 670-1 of each area read from the ROM 660 or the maintenance cylinder area of the disk 12 is loaded to the RAM 670 by the processor 630 and used by the processor 630. The RAM 670 may be implemented as a DRAM (Dynamic Random Access Memory) or an SRAM (Static Random Access Memory). The RAM 670 may be designed to be driven according to an SDR (Single Data Rate) method or a DDR (Double Data Rate) method.

The processor 630 may control the disk drive 600a to execute the method for merging data written on the storage medium 124 according to the flow charts of FIGS. 19 to 23, FIGS. 27 to 29, and FIG. 31 and the method for controlling a write operation on the storage medium 124 according to the flow charts FIGS. 24 and 25 by using the program codes and information stored in the maintenance cylinder area of the disk 12.

A data read operation and a data write operation of the disk drive 600a will be described.

In case of a data read operation, the disk drive 600a amplifies an electrical signal sensed by the head 16 from the disk 12 by the pre-amplifier 610. The read/write channel 620 converts a signal output from the pre-amplifier 610 into a digital signal and decodes it to detect data. The read/write channel 620 may temporarily store the signal output from the pre-amplifier in the read buffer 620-1. The decoded and detected data is subjected to an error correction using an error correction code such as a Reed Solomon code in the processor 630, and then converted into stream data. The stream data is transmitted to the host device 110 through the host interface unit 680.

In case of a data write operation, the disk drive 600a receives data from the host device 110 through the host interface unit 680. The processor 630 adds an error correction symbol by a Reed Solomon code to the received data. The data to which the error correction symbol was added by the read/write channel 620 is coded to fit a write channel. The data coded by the pre-amplifier 610 is written to the disk 12 through the head 16 by an amplified write current.

The RAM 670 and the ROM 660 in FIG. 6a may be referred to as a single information storage unit.

Figure 6B:
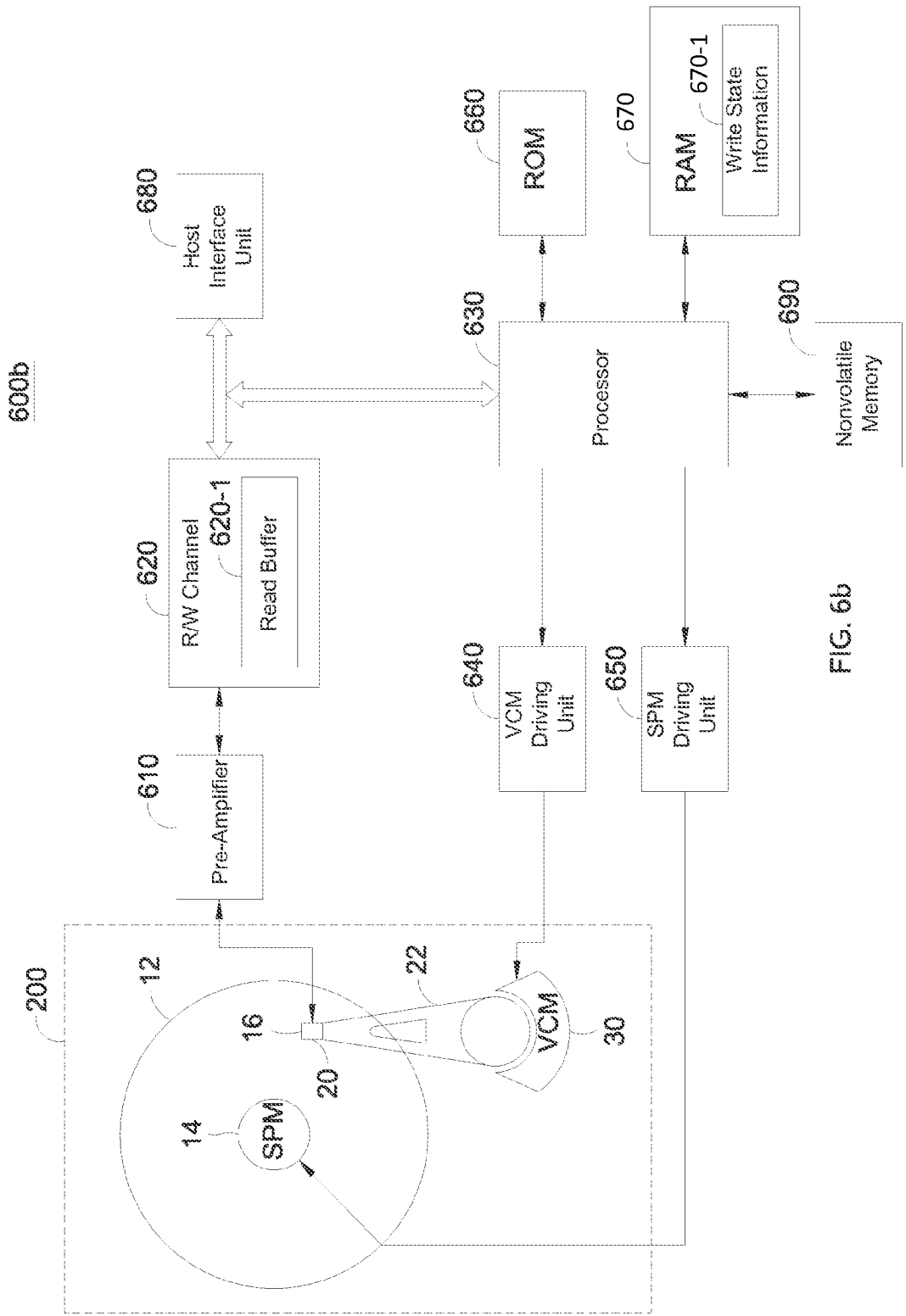
FIG. 6b is an electrical function block diagram of a storage device when the storage device of FIG. 1a is a disk drive.

FIG. 6b is an electrical function block diagram of the storage device 120b when the storage device 120b of FIG. 1b is a disk drive.

The disk drive 600b as shown in FIG. 6b further includes a nonvolatile memory 690 added to the disk drive 600a shown in FIG. 6a. A portion of data to be stored in the disk drive 600b may be stored in the nonvolatile memory 690. For example, various information required for controlling the disk drive 600b may be stored in the nonvolatile memory 690.

The program codes and information for executing the method according to the flow charts of FIGS. 19 to 23, FIGS. 27 to 29, and FIG. 31 and information may be stored in the nonvolatile memory 690. In detail, a mapping table for converting logical block addresses into virtual addresses on the basis of a virtual zone or a virtual band may be stored in the nonvolatile memory device 690. Also, code objects for implementing various functions of the storage device 600b may also be stored in the nonvolatile memory 690.

The processor 630 is coupled to the ROM 660, the RAM 670, and the nonvolatile memory 690, respectively. Firmware and control data for controlling the disk drive are stored in the ROM 660. The program codes and information for executing the method according to the flow charts of FIGS. 19 to 23, FIGS. 27 to 29, and FIG. 31 and information may be stored in the ROM 660. Of course, the program codes and information for executing the method according to the flow charts of FIGS. 19 to 23, FIGS. 27 to 29, and FIG. 31 and information may be stored in the maintenance cylinder area of the disk 12 or in the nonvolatile memory 690 instead of the ROM 660.

The program codes and information stored in the ROM 660, the disk 12, or the nonvolatile memory 690 are loaded to the RAM 670 in an initialization mode.

Figure 7:
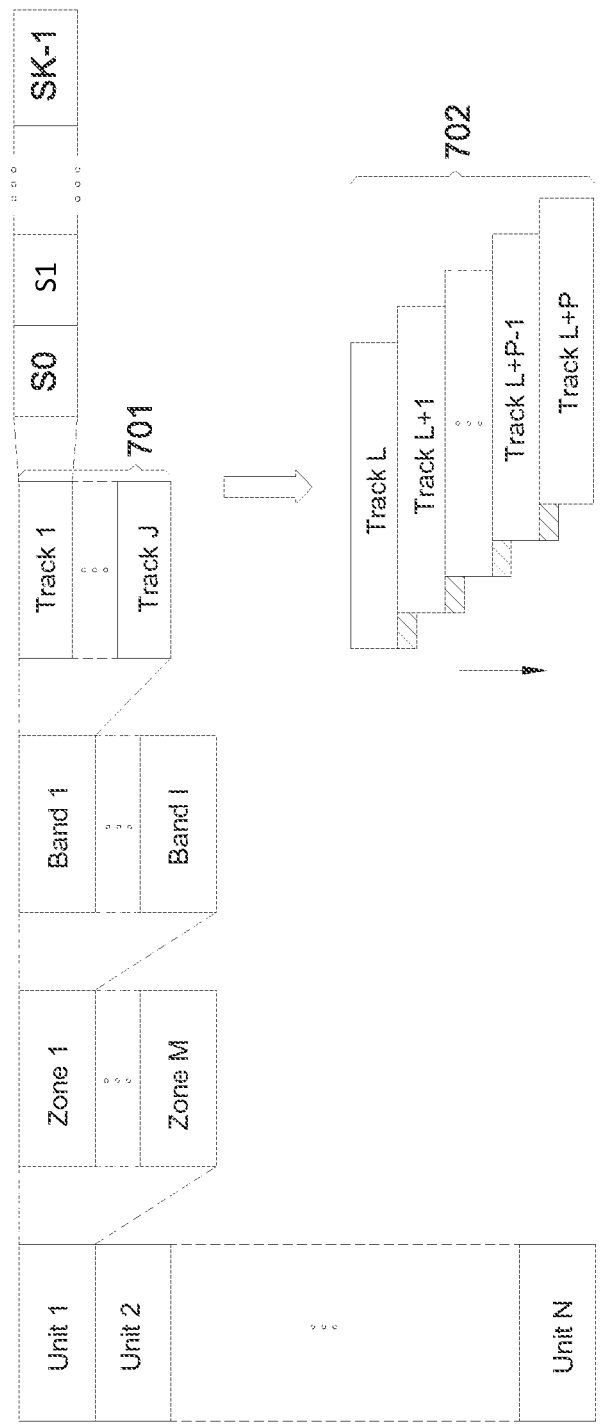
FIG. 7 is a conceptual view showing a physical structure of a storage medium or a disk applied to preferred embodiments of the present invention.

A repeated description of the same elements as described above in the disk drive 600a will be omitted. The physical structure of the storage medium 124 of FIGS. 1a and 1b and the disk 12 of FIGS. 6a and 6b may be defined as shown in FIG. 7. FIG. 7 is a conceptual view showing a physical structure or a layout of the storage medium 124 or the disk 12 used in the preferred embodiments of the present invention. Hereinafter, for the sake of explanation, the disk 12 of FIG. 6a will be described, but it would be interpreted that the storage medium 124 of FIGS. 1a and 1b and the disk 12 of FIG. 6b also have the same physical structure or layout.

With reference to FIG. 7, the disk 12 may include N (N is a natural number) of units. One unit may include M (M is a natural number) number of zones. One zone may include I (I is a natural number) number of bands. One band may include J (J is a natural number) number of tracks. One track may include K (K is a natural number) number of sectors. Each zone may include the same number of bands or a different number of bands according to a physical structure. Each track may include the same number of sectors or a different number of sectors according to a physical structure of the disk 12. The band may be referred to as a virtual band (VB), a physical band (PB), or a disk band (DB). The virtual band is a band on the basis of physical addresses or a physical position, which is on the basis of an HTL to be described later.

In order to enhance a write density, data may be written to each band on the basis of a shingled write operation. When data is written to each band on the basis of the shingled write operation, like the track L (L is a natural number) to L+P (P is a natural number) 702 of FIG. 7, tracks included in the band may be illustrated such that data is written in the arrow direction while being overlapped in a partial area of a previous track. For example, data is written as the track L+1 overlaps with a partial area of the track L, and data is written as the track L+P overlaps with a partial area of the track (L+P−1).

In an example where a physical area of the band including track L to track L+P 702 (shingled) and that of the band including the track 1 to track J 701 (non-shingled) are the same, the number of tracks included in the band including the track L to track L+P 702 may be greater than the number of tracks of the band including the track 1 to track J 701. This is because the track L to track L+P 702 has a higher TPI (Track Per Inch) than that of the track 1 to track J 701.

Figure 8A:
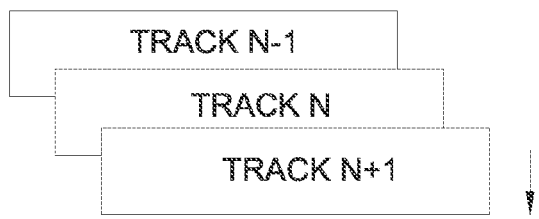
FIGS. 8a and 8b are views for explaining restriction conditions when data is written in storage medium or a disk on the basis of a shingled write operation.
Figure 8B:
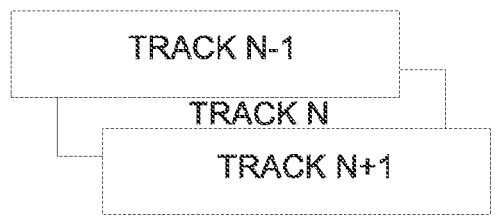

However, when shingled write operation is performed in units of bands, writing should be performed only in one direction. In the case of the disk 12 shown in FIG. 6a, data should be written only in an inner circumferential direction or outer circumferential direction. This is because the restriction conditions as shown in FIGS. 8a and 8b. FIGS. 8a and 8b are views for explaining restriction conditions when data is written on the basis of a shingled write operation.

With reference to FIG. 8a, when a shingled write operation is performed in the arrow direction as shown in FIG. 8a, flux is generated only in the arrow direction. Thus, when data is written on the basis of a shingled write operation, restriction conditions that after data is written to a track TRACK N, data cannot be written to a track TRACK N−1 should be satisfied. As shown in FIG. 8a, if data is written to the track TRACK N and then data is written to the track TRACK N−1 in the opposite direction to the direction in which the shingled write is in process, the data written to the track TRACK N is erased by adjacent track interference (ATI).

Thus, when data is written on the basis of the shingled write operation, a technique of dynamically allocating physical addresses of the disk 12 with respect to logical addresses received from the host device 110 such that data is written in any one of the inner circumferential direction or outer circumferential direction of the disk 12 all the time is required.

HTL is a technique proposed to satisfy the restriction conditions when data is written on the basis of the foregoing shingled write operation. HTL converts logical block addresses transmitted from the host device 110 into virtual block addresses and converts virtual block addresses into physical block addresses of the disk 12 to access the disk 12. The physical block address may be an address on the basis of a CHS (Cylinder Head Sector), for example.

The virtual block address may be an address on the basis of a physical position or a physical block address, or may be an address on the basis of a physical position or a physical block address dynamically allocated to a logical block address to satisfy the write conditions in the foregoing one direction.

When the processors 121 and 630 are operated on the basis of the HTL, the processors 121 and 630 convert the logical block addresses received from the host device 110 into virtual block addresses. Next, the processors 121 and 630 convert virtual block addresses into physical block addresses of the storage medium 124 or the disk 12 and write data to the storage medium 124 or the disk 12 or read data from the storage medium 124 or the disk 12.

Figure 9:
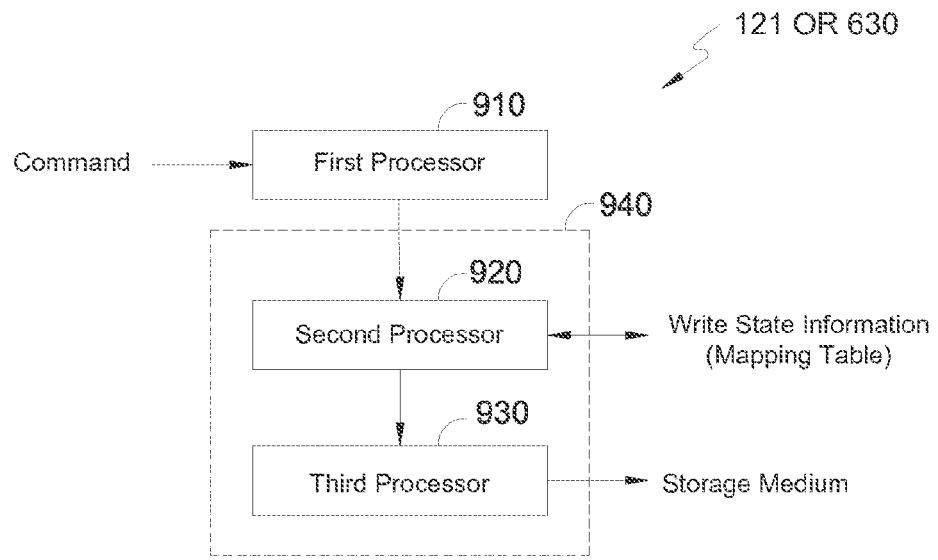
FIG. 9 is a view showing an example of a configuration of processors in storage devices according to a preferred embodiment of the present invention.

When the processors 121 and 630 are operated on the basis of the HTL, the processors 121 and 630 may be configured as shown in FIG. 9. FIG. 9 is a view showing an example of a configuration of the processors on the basis of the HTL, and may be a configuration example of the processors 121 and 630 included in the storage devices 100a, 100b, 600a, and 600b according to preferred embodiment of the present invention.

With reference to FIG. 9, the processor 121 or 630 may include a first processor 910, a second processor 920, and a third processor 930. Here, the second processor 920 and the third processor 930 may be designed to be integrated into a single processor 940. Obviously, although not shown, the first processor 910 and the second processor 920 may also be designed to be integrated into a single processor.

The first processor 910 may receive a command from the host device 110, and perform an operation of extracting logical block addresses from the received command.

The second processor 920 may perform an operation of converting the logical block addresses extracted from the first processor 910 into virtual block addresses. Namely, the second processor 920 may convert the logical block addresses into virtual block addresses by using a mapping table included in write state information 670-1 stored in the RAM 670. The mapping table may include address mapping information obtained by mapping the logical block address and the virtual block address and the information regarding the virtual block addresses to be mapped to the received logical block address.

Also, the second processor 920 may perform a merge operation to control such that data read from a source area to be merged to the disk 12 according to a selected merge operation on the basis of the write state information in units of bands illustrated in FIG. 7 is written to a destination area of the disk 12. The reading and writing operation of writing the data read from the source area to the destination area may be implemented by using a moving operation of moving the data written to the source area to the destination area. The foregoing merge operation may be performed irrespective of a command received from the host device 110.

Figure 10:
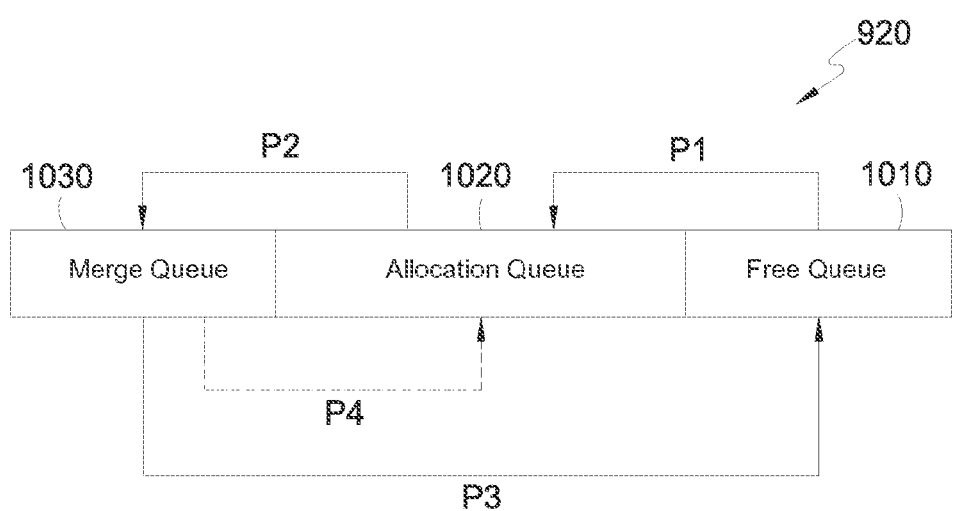
FIG. 10 is a view showing relationships of queues included in a second processor illustrated in FIG. 9.

In order to perform the foregoing merge operation, the second processor 920 may manage the bands illustrated in FIG. 7 of the storage medium 124 or the disk 12 by using a free queue 1010, an allocation queue 1020, and a merge queue 1030 as shown in FIG. 10. As for the source area whose information is stored in the merge queue 1030 and which is to be merged, the information regarding the source area stored in the merge queue 1030 is deleted after the merge operation according to an embodiment of the present invention is completed. The merge queue 1030 may be referred to as a garbage queue. The merged source area may be changed into a free area at a required time. The time at which the source area is changed into a free area may be defined as a time generally when a free area is required. However, when the information regarding the source area stored in the merge queue 1030 is deleted, the source area may be changed into a free area.

FIG. 10 is a view showing relationships of queues included in the second processor 920. Hereinafter, an example applied to the disk 12 will be described for the sake of explanation, but it should be construed that the following content is applied to the storage medium 124 in the same manner.

The free queue 1010 illustrated in FIG. 10 may store information regarding an available band in the disk 12. The foregoing band may be interpreted as a physical band, a virtual band, or a disk band, but hereinafter, for the sake of explanation, the band will be referred to as a physical band.

The physical band whose information is stored in the free queue 1010 is a physical band not including a sector in which valid data is written, and may be used as a destination band when a merge operation according to preferred embodiments of the present invention is performed. The destination band may be referred to as a free area or a free band of the disk 12. The physical band whose information is stored in the free queue 1010 is a physical band not allocated to logical bands to be mentioned later in FIG. 11.

The allocation queue 1020 illustrated in FIG. 10 may store information regarding a physical band which has been used or is currently used in the disk 12. The physical band which has been used or is currently used may be a physical band allocated to one of logical bands to be mentioned in FIG. 11.

The merge queue 1030 may store information regarding the physical band which has been used or is currently used in the disk 12 like in the allocation queue 1020. However, the physical band storing information regarding the merge queue 1030 may be used as a source area to be merged when a merge operation according to preferred embodiments of the present invention is performed. The physical band whose information is stored in the allocation queue 1020 is not used as a source area to be merged. The source area to be merged may be referred to as a merge standby area or a merge standby band.

The management operation with respect to the physical band information on the basis of the queues illustrated in FIG. 10 will be described in more detail as follows.

Figure 11:
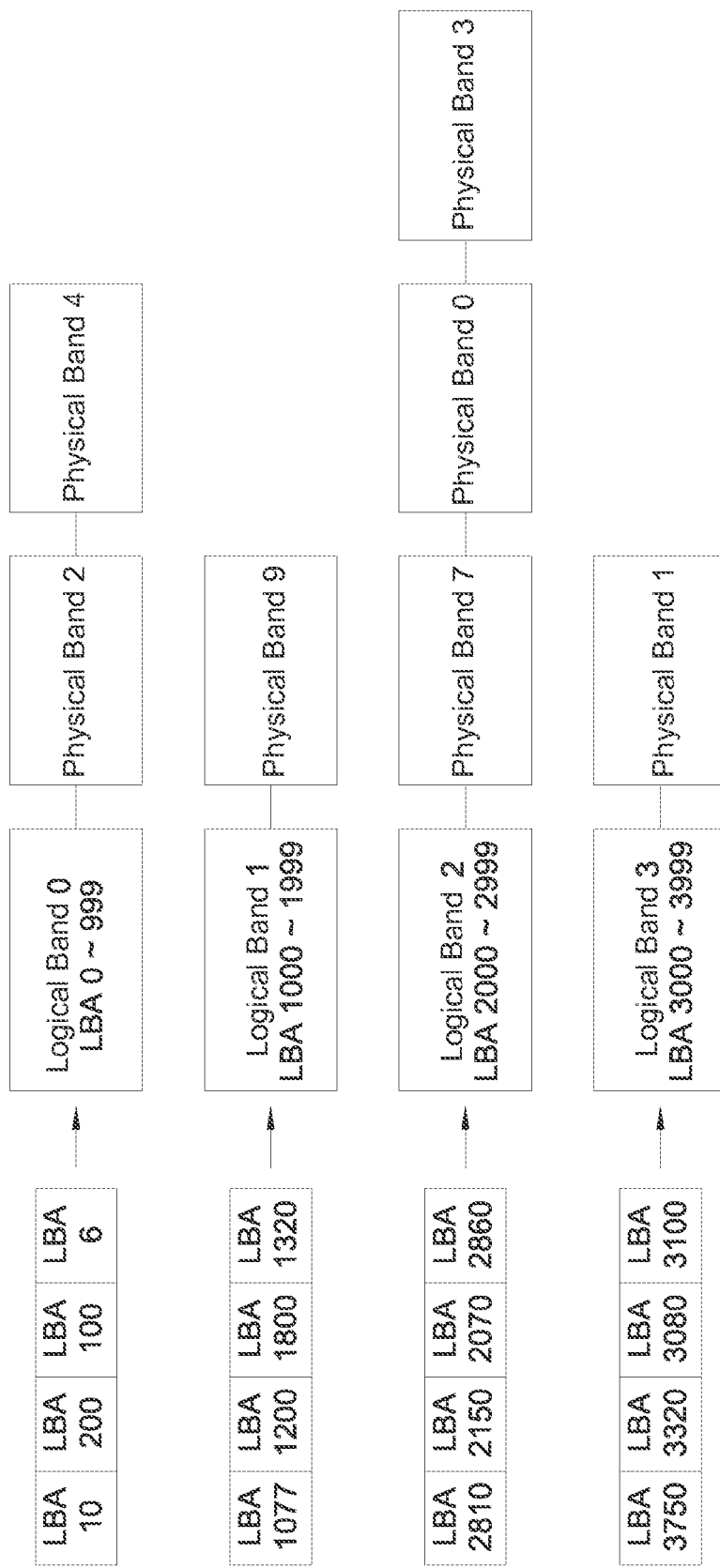
FIG. 11 is a view showing relationship between a logical block address, a logical band, and a physical band applied to preferred embodiments of the present invention.

FIG. 11 is a view showing relationship between logical block addresses (LBA) received from the host device 110, a logical band on the basis of the logical block address, and a physical band of the disk 12 applied to preferred embodiments of the present invention.

FIG. 11 shows a case in which when logical block addresses LBAs 0 to 3999 received from the host device 110 are divided into a logical band (LB) 0, a logical band 1, a logical band 2, and a logical band 3, physical bands 2 and 4 are allocated to the logical band 0, a physical band 9 is allocated to the logical band 1, physical bands 7, 0, and 3 are allocated to the logical band 2, and a physical band 1 is allocated to the logical band 3.

Figure 12:
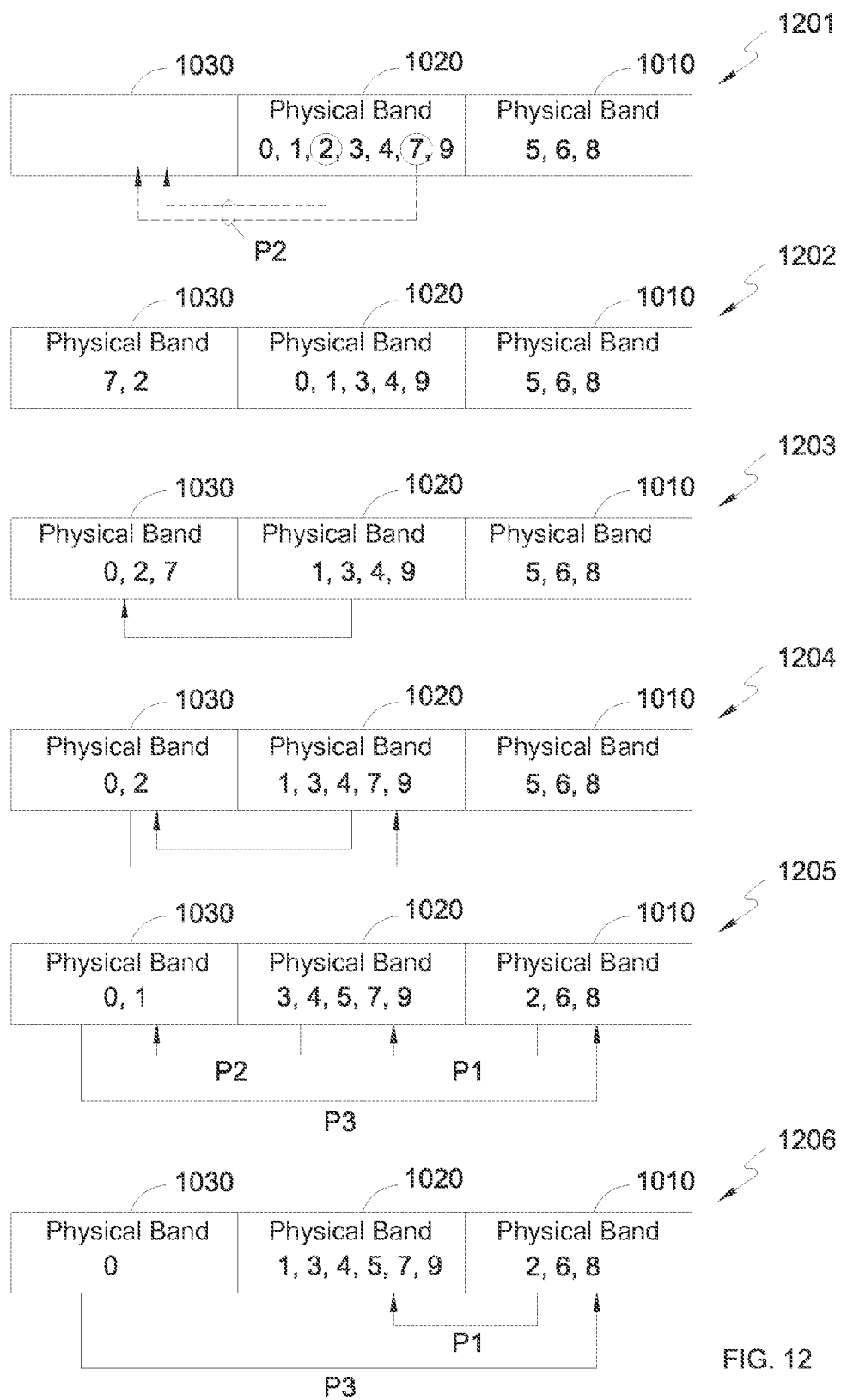
FIG. 12 is a view showing data stored in a queue illustrated in FIG. 10 on the basis of FIG. 11.

When physical bands are allocated as shown in FIG. 11, the information stored in the allocation queue 1020 of FIG. 10 may be defined as shown in 1201 in FIG. 12. FIG. 12 shows physical band information stored in the free queue 1010, the allocation queue 1020, and the merge queue 1030 illustrated in FIG. 10 on the basis of FIG. 11. In case of FIG. 12, the information stored in the free queue 1010, the allocation queue 1020, and the merge queue 1030 is identification information of physical bands. However, the information stored in the queues 1010, 1020, and 1030 is not limited thereto.

With reference to 1201 in FIG. 12, it can be seen that physical bands which can be allocated to the logical bands 0 to 3 is 0 to 9 and physical bands 5, 6, and 8 are not allocated to any logical bands yet. The physical bands not allocated to any logical bands are free bands and may be selected or set as a destination area when a merge operation is performed as described above.

When the physical band 2 and the physical band 7 among the physical bands stored in the allocation queue 1020 are determined to be physical bands to be merged, the second processor 920 stores information regarding the physical bands 2 and 7 stored in the allocation queue 1020 in the merge queue 1030 (P2). Accordingly, the information stored in the allocation queue 1020 and the merge queue 1030 are updated as indicated by 1202.

The second processor 920 may determine physical bands to be merged on the basis of the number of invalid sectors (invalid sector count) of the physical bands whose information are stored in the allocation queue 1020.

Namely, the second processor 920 may determine physical bands to be merged by comparing the number of invalid sectors between the physical bands whose information are stored in the allocation queue 1020 or determine physical bands to be merged by comparing a threshold value and the number of invalid sectors of respective physical bands. The foregoing threshold value may be determined according to conditions appropriate for determining as physical bands to be merged on the basis of the ratio between a total number of sectors included in the physical bands and the number of invalid sectors. Thus, the physical bands 2 and 7 stored in the merge queue 1030 may be interpreted as physical bands whose number of invalid sectors is greater than the physical bands stored in the allocation queue 1020 or physical bands whose number of sectors is greater than the foregoing threshold value.

The information regarding the physical bands to be merged, which is stored in the merge queue 1030, may be updated whenever a write command is received. Namely, whenever a write command is received, whether the physical bands whose information is stored in the allocation queue 1020 corresponds to the physical bands to be merged is determined and information stored in the merge queue 1030 may be updated as described above. When the information stored in the merge queue 1030 is updated, the information stored in the allocation queue 1020 may also be updated.

For example, as shown by 1202 in FIG. 12, in a state in which information is stored in the allocation queue 1020, when it is determined that the number of invalid sectors of the physical band 0 is greater than the number of invalid sectors of the physical band 2 whose information is stored in the merge queue 1030, when it is determined that the number of invalid sectors of the physical band 0 is greater than the number of invalid sectors of other physical bands whose information is stored in the allocation queue 1020, or when it is determined that the number of invalid sectors of the physical band 0 is greater than the foregoing threshold value, the second processor 920 may update the information stored in the allocation queue 1020 and the information stored in the merge queue 1030 as shown in 1203 of FIG. 12 (P2).

When the number of information that can be stored in the merge queue 1030 is limited to 2, the second processor 920 may be implemented to compare the information regarding the physical band 0 to the number of invalid sectors between the physical bands 0, 2, and 7 before storing it in the merge queue 1030, stores information regarding upper two bands having the greatest number of invalid sectors in the merge queue 1030, and feed back information regarding the remaining one band to the allocation queue 1020 (P4). For example, among the physical bands 0, 2, and 7, when the number of the invalid sectors of the physical band 7 is the smallest, the information regarding the physical band 0 may be stored in the merge queue 1030 (P2), the information regarding the physical band 7 stored in the merge queue 1030 may be deleted, and the information regarding the physical band 7 may be stored in the allocation queue 1020 (P4). Accordingly, the information stored in the respective queues 1010, 1020, and 1030 may be defined as shown in 1204 of FIG. 12.

When the operation in which one of the physical bands, whose information is stored in the merge queue 1030, is selected as a source area to be merged, one of the physical bands, whose information is stored in the free queue 1010, is selected as a destination area in case of merging, and data read from the source area to be merged through merge processing is written to the destination area is completed, the information regarding the physical band with respect to the source area to be merged, which has been stored in the merge queue 1030, is deleted and the information regarding the physical band with respect to the source area to be merged is registered to the free queue 1010 (P3), and the information regarding the physical band corresponding to the destination area is registered to the allocation queue 1020 (P1). For example, when a merge operation of writing data, which has been read from the physical band 2, to the physical band 5 is completed, as shown in 1205 of FIG. 12, the information regarding the physical band 2, which has been stored in the merge queue 1030, is deleted, the information regarding the physical band 2 is registered to the free queue 1010 (P3), the information regarding the physical band 5, which has been registered to the free queue 1010, is deleted, and the information regarding the physical band 5 is registered to the allocation queue 1020 (P1).

At this time, P3 may not be performed immediately when the information regarding the source area to be merged, which has been stored in the merge queue 1030. Namely, the second processor 920 may temporarily retain the information regarding the deleted source area in the merge queue 1030, and when a free area is required, P3 may be performed to register the information regarding the merged source area to the free queue 1010. Also, the physical band 1 which has been registered to the allocation queue 1020 in 1205 of FIG. 12, is a physical band whose number of invalid sectors is greater than that of the other physical bands registered to the allocation queue 1020 and is determined to be a physical band to be merged, the information regarding the physical band 1 is moved to the merge queue 1030 (P2).

When a physical band to be merged is determined, if the foregoing threshold value is used, the information stored in the merge queue 1030 may not be updated as shown in 1206 of FIG. 12. Namely, unlike 1203 of FIG. 12, when the number of invalid sectors of the physical band 1 is not greater than a threshold value although the number of the invalid sectors of the physical band 1 is greater than the number of invalid sectors of other physical bands in the allocation queue 1020, the information regarding the physical band corresponding to the source area to be merged, which has been stored in the merge queue 1030, may be deleted but the information regarding the physical band corresponding to the source area to be newly merged may not be stored in the merge queue 1030.

The merge queue 1030 may store information regarding a physical band such that a physical band is selected according to the number of invalid sectors. For example, among the physical bands 2 and 7, when the number of the invalid sectors of the physical band 7 is greater than that of the invalid sectors of the physical band 2, the merge queue 1030 may store information such that the physical band 7 is first selected, then the physical band 2 when a merge operation is performed. However, a physical band to be merged may be selected according to order registered to the merge queue 1030.

P1, P2, P3, and P4 illustrated in FIG. 12 may be referred to as a data movement path stored in the respective queues 1010, 1020, and 1030. When P1, P2, P3, and P4 are referred to as a data movement path, the information regarding the physical bands stored in the respective queues 1010, 1020, and 1030 may be implemented to be moved to different queues through the foregoing movement path.

The second processor 920 may operate the free queue 1010, the allocation queue 1020, and the merge queue 1030 by the unit illustrated in FIG. 7 or by zone. FIG. 11 shows an example in which logical bands 0, 1, 2, and 3 are allocated to a single zone. However, the second processor 920 may operate the free queue 1010, the allocation queue 1020, and the merge queue 1030 over the entirety of the disk 12 regardless of a unit or a zone.

The physical bands of FIG. 11 may be referred to as virtual bands when the processor 121 or 630 is operated on the basis of HTL. The virtual band is one of virtual bands within a zone of the storage medium 124 or the disk 12 and dynamically allocated with respect to a received logical block address. As described above, the virtual band may be referred to as being on the basis of a virtual address. Thus, when the processor 121 or 630 is operated on the basis of the HTL, a merge operation on the basis of physical addresses mentioned in the preferred embodiments of the present invention may be mentioned as a virtual address-based merge operation.

Meanwhile, the third processor 930 of FIG. 9 may manage write state information 670-1 stored in the RAM 670, and control the R/W channel 620, the pre-amplifier 610, the VCM driving unit 640, and the SPM driving unit 650 such that valid data is read from the source area and written to the destination area.

A merge operation according to a preferred embodiment of the present invention is performed to secure an area of the storage medium 124 or the disk 12 in order to write data when the storage device 120 having the storage medium 124 or the disk 12 in which data is written is in an idle state or when a write command is received but a write-available area is insufficient.

Since the merge operation according to a preferred embodiment of the present invention may be performed within the storage device 120 or 600 regardless of a command from the host device 110, it may be an overhead operation according to use of the storage device 120 or 600 at the host device 110 side. Thus, as the merge operation is rapidly performed on the storage medium 124 or the disk 12, the performance of the host device-storage device-based system 100 can be improved.

A source area to be merged is a physical band having the greatest number of invalid sectors among the physical bands allocated to the respective logical bands. Information regarding the physical band may be registered to the merge queue 1030 illustrated in FIGS. 10 and 12 and used. Hereinafter, in the description of the preferred embodiments of the present invention, the source band to be merged will be referred to as a source area as described above and a free band in which data, which has been read from the source area, is written according to a merge operation will be referred as a destination area. Both of the source area and the destination area may be physical bands of the storage medium 124 or the disk 12 illustrated in FIG. 7 or virtual bands mentioned in HTL.

The processor 121 or 630 may select one of physical address-based merge operation and logical address-based merge operation on the basis of write state information of the source area, and control the storage medium interface unit 125 or the storage device 600a or 600b according to the selected merge operation. Accordingly, data is read from the source area by using any one of physical addresses and logical addresses included in address mapping information of the source area according to the selected merge operation, and the read data is written to the destination area. When the write operation on the destination area is completed, the processor 121 or 630 may set the source area as a free area of the storage medium 124 or the disk 12. As described above, the source area may be set as a free area when a free area is required or after a merge operation is completed.

Figure 13:
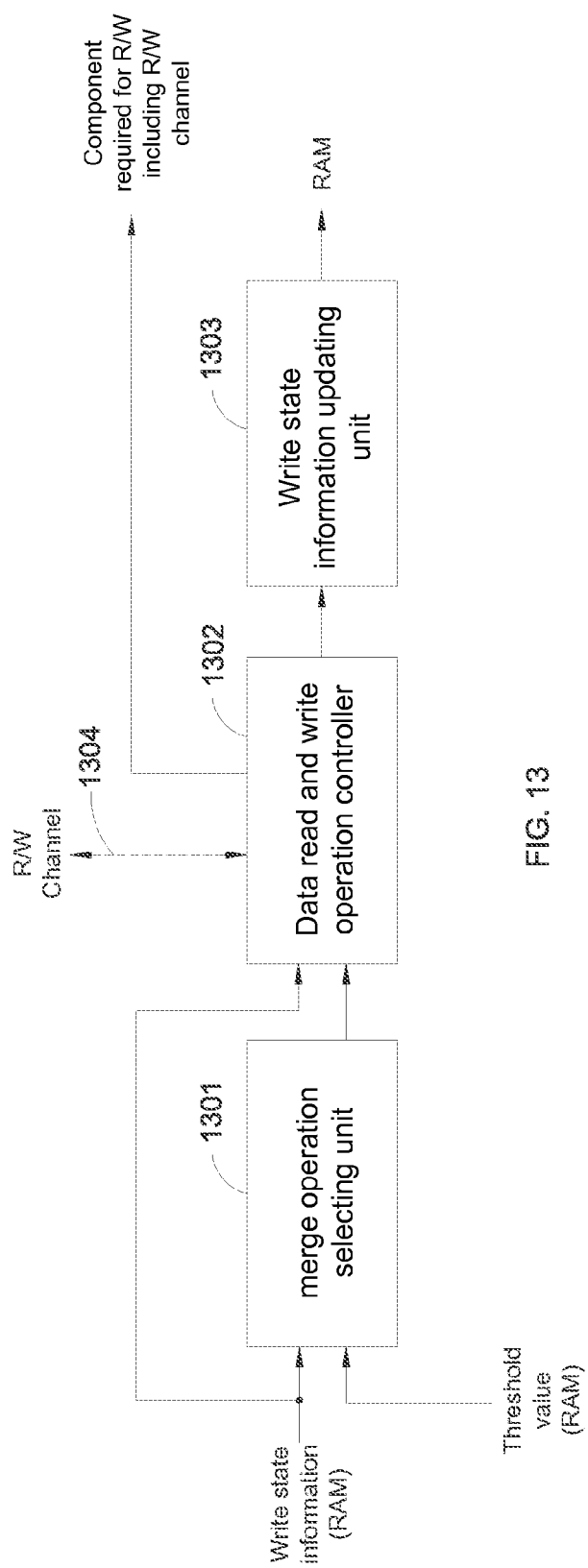
FIG. 13 is a view showing another example of a configuration of a processor included in the storage according to a preferred embodiment of the present invention.

In order to operate as described, the processor 121 or 630 may be configured as illustrated in FIG. 13. FIG. 13 is a view showing another example of a configuration of the processor 121 or 630 included in the storage device according to a preferred embodiment of the present invention. Hereinafter, for the sake of explanation, an example of performing by the processor 630 will be described. However, the same operation may also be performed by the processor 121.

With reference to FIG. 13, the processor 630 may include a merge operation selecting unit 1301, a data read and write operation controller 1302, and a write state information updating unit 1303. However, the configuration of the processor 630 is not limited to the configuration illustrated in FIG. 13.

The merge operation selecting unit 1301 selects the merge operation on the basis of write state information 670-1 read from the RAM 670 and a threshold value read from the RAM 670. The threshold value may be set according to at least one of a size of a source area and the number of sectors included in the source area. For example, the foregoing threshold value may be set on the basis of the number of address mapping information items capable of enhancing a merge operation speed in comparison to merging on the basis of physical addresses when merging is performed on the basis of logical addresses mentioned in an embodiment of the present invention while not exceeding 50% of the number of sectors included in the source area. Enhancing the merge operation speed may be interpreted as reducing a merge operation time. The threshold value may be stored in a maintenance cylinder area of the disk 12 of the ROM beforehand, and loaded to the RAM 670 by the process 630 so as to be used.

When the number of address mapping information items included in the write state information 670-1 of the source area is greater than the foregoing threshold value, the merge operation selecting unit 1301 selects physical address-based merge operation. Meanwhile, it may be configured such that when the number of address mapping information items included in the write state information 670-1 of the source area is not greater than the foregoing threshold value, the merge operation selecting unit 1301 selects logical address-based merge operation.

Or, the merge operation selecting unit 1301 may select a merge operation by using the number of address mapping information items included in the write stat information 670-1 of the source area and the number of sectors in which valid data is written in the source area. In this case, the threshold value includes a first threshold value and a second threshold value. The first threshold value and a second threshold value may be set on the basis of the reference such as that of the foregoing threshold value according to at least one of the size of the source area and the number of the sectors of the source area.

When the number of address mapping information items of the source area is greater than the first threshold value or when a value obtained by dividing the number of the sectors in which the valid data is written by the number of the address mapping information items is greater than the second threshold value, the merge operation selecting unit 1301 selects the physical address-based merge operation. Meanwhile, when the number of address mapping information items of the source area is not greater than the first threshold value or when a value obtained by dividing the number of the sectors in which the valid data is written by the number of the address mapping information items is not greater than the second threshold value, the merge operation selecting unit 1301 selects the logical address-based merge operation.

Or, the merge operation selecting unit 1301 may select a merge operation by using only the value obtained by dividing the number of the sectors in which the valid data is written by the number of the address mapping information items of the source area. Namely, when the foregoing value obtained by the division is greater than the threshold value, the merge operation selecting unit 1301 may select the physical address-based merge operation, and when the foregoing value obtained by the division is not greater than the threshold value, the merge operation selecting unit 1301 may select the logical address-based merge operation. The threshold value used herein has a value corresponding to the foregoing second threshold value.

When the selected merge operation is the physical address-based merge operation, the data read and write operation controller 1302 reads data from the source area on the basis of physical addresses of the address mapping information of the source area of the disk 12, and controls a data read operation and write operation of writing the read data to a destination area of the disk 12. Here, the data read and write operation controller 1302 sorts the address mapping information of the source area on the basis of the physical addresses and reads data from the source area on the basis of the sorted address mapping information.

Meanwhile, when the selected merge operation is the logical address-based merge operation, the data read and write operation controller 1302 reads data from the source area of the disk 12 on the basis of logical addresses of the address mapping information of the source area of the disk 12 and controls a data read operation and write operation of writing the read data to a destination area of the disk 12. The data read from the source area is valid data.

When the foregoing physical address-based merge operation or logical address-based merge operation is performed, the amount of read data may be determined according to the size of a read buffer 620-1. Thus, the data read and write operation controller 1302 may read data from the source area of the disk 12 through the read buffer 620-1 of the R/W channel 620 and write data temporarily stored in the read buffer 620-1 of the R/W channel 620 to a destination area of the disk 12.

However, as described above, the data read from the source area of the disk 12 may be temporarily stored in the data read and write operation controller 1302 included in the processor 630 and written to the destination area of the disk 12. To this end, the data read and write operation controller 1302 may be configured to have a function of receiving data read from the R/W channel 620 through a line 1304, temporarily storing the received data, and transmitting the data to the R/W channel 620.

Or, the data read from the source area of the disk 12 may be temporarily stored in the RAM 670, read, and written to the destination area of the disk 12. To this end, the operation control function of the data read and write operation controller 1302 with respect to the RAM 670 of the controller 1302 may be changed. When the processor 630 is the processor 121 of FIG. 1a, the component required for the read operation and the write operation including the foregoing R/W channel 620 may be interpreted to correspond to the storage medium interface unit 125.

When the operation of writing the data, which has been read from the source area of the disk 12 by the data read and write operation controller 1302, to the destination area of the disk 12 is completed, the data read and write operation controller 1302 requests updating of write state information with respect to the source area and the destination area of the disk 12 from the write state information updating unit 1303. Accordingly, the write state information updating unit 1303 updates the write state information of the source area and the destination area of the disk 12 stored in the RAM 670. The write state information of the source area and the destination area of the disk 12 changed by the foregoing merging operation is generated by the data read and write operation controller 1302 and provided to the write state information updating unit 1303.

Hereinafter, the data merging method according to a preferred embodiment of the present invention will be described in more detail with reference to FIGS. 14 to 17 and FIG. 13.

FIGS. 14 through 17 are views showing data merging according to a preferred embodiment of the present invention. FIGS. 14 and 16 are views showing data merging on the basis of physical addresses. FIGS. 15 and 17 are views showing data merging on the basis of logical addresses.

Figures 14A, 14B:
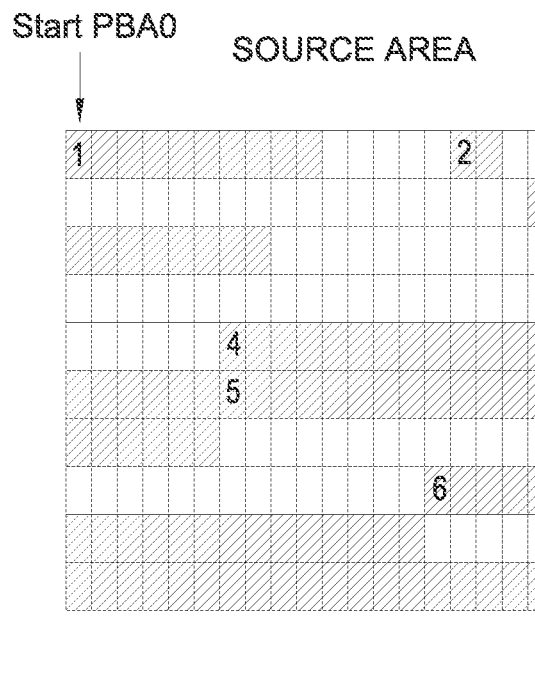
FIGS. 14 through 17 are views showing merging according to a preferred embodiment of the present invention.

With reference to FIG. 14, when a source area to be merged is as shown in FIG. 14a, address mapping information with respect to FIG. 14a is like that of FIG. 14b. The numbers illustrated in FIG. 14a indicate a first sector of sectors in which valid data is continuously written. Thus, the number of sectors (or the number of address mapping information items) in which continuously valid data is written in the source area can be known on the basis of the numbers illustrated in FIG. 14a, but the numbers illustrated in FIG. 14 are not written in the disk 12 as data merely for explanation.

With reference to FIGS. 14a and 14b, the number of address mapping information items of the source area of FIG. 14a is 7. The number of the address mapping information items may be referred to as a number of valid keys. Thus, the address mapping information may be referred to as a valid key.

Figures 14C, 14D:
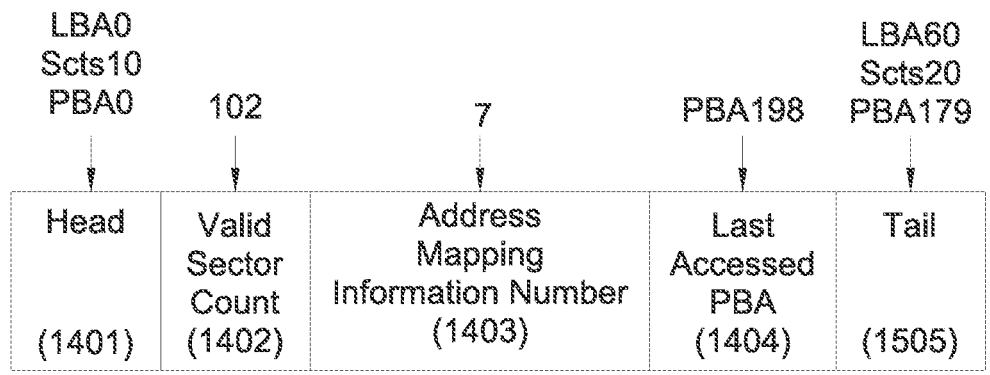

The SAT (Sector Allocation Table) with respect to the source area of FIG. 14a may be defined as shown in FIG. 14c. The SAT and address mapping information are included in the write state information 670-1 of the source area.

With reference to FIG. 14c, the SAT may include a first address mapping information (Head) 1401, the number of sectors in which valid data is written in the source area (Valid Sector Count) 1402, the number of address mapping information items (Address Mapping Information Number) 1403, last accessed physical address (Last Accessed PBA) 1404, and the last address mapping information of the source area (Tail) 1405, but the SAT is not limited to the illustration of FIG. 14c.

The merge operation selecting unit 1301 may select a merge operation with respect to the source area of FIG. 14a with reference to the SAT of FIG. 14c. Namely, in FIG. 14a, when the number of address mapping information items is 7 and the foregoing threshold value is 6, since the number 7 of the address mapping information items is greater than the threshold value 6 (7>6), the merge operation selecting unit 1301 selects the physical address-based merge operation with respect to the source area of FIG. 14a.

Or, the merge operation selecting unit 1301 may select a merge operation on the basis of the results obtained by comparing a value (102/7=14.57) obtained by dividing the number (SN=102) of the sectors in which valid data is written in the source area by the number (7) of the address mapping information items to a threshold value as described above. Namely, when the threshold value with respect to the value obtained by the division is set to be 10, since the value (102/7=14.57) obtained by the division is greater than the threshold value (14.57>10), the merge operation selecting unit 1301 may select the physical address-based merge operation with respect to the source area.

Or, the merge operation selecting unit 1301 may select the merge operation in consideration of both of the foregoing two conditions. Namely, when one of the number of the address mapping information items and the value obtained by the division is greater than the threshold value for comparison, the merge operation selecting unit 1301 may select the physical address-based merge operation with respect to the source area. In case of the source area of FIG. 14a, since the number (7) of the address mapping information items is greater than the first threshold value (6) (7>6) and the value (14.57) obtained by the division is also greater than the second threshold value (10) (14.57>10), the merge operation selecting unit 1301 may select the physical address-based merge operation with respect to the source area.

However, when the number of the address mapping information items is greater than the first threshold value but the value obtained by the division is not greater than the second threshold value, the merge operation selecting unit 1301 may also select the physical address-based merge operation with respect to the source area to be merged.

When the merge operation selecting unit 1301 selects the physical address-based merge operation, the data read and write operation controller 1302 sorts the address mapping information of the source area on the basis of physical addresses. Accordingly, the address mapping information of FIG. 14b is changed as shown in FIG. 14d.

The data read and write operation controller 1302 reads data from the source area of the disk 12 through the read buffer 620-1 on the basis of the physical addresses of the address mapping information sorted as shown in FIG. 14d. When the size of the read buffer 620-1 is greater than the number of the valid sectors written in the source area of FIG. 14a, data written to the source area of FIG. 14a is entirely read one time and temporarily stored in the read buffer 620-1 on the basis of the physical addresses of the address mapping information of FIG. 14d.

Figures 14E, 14F:
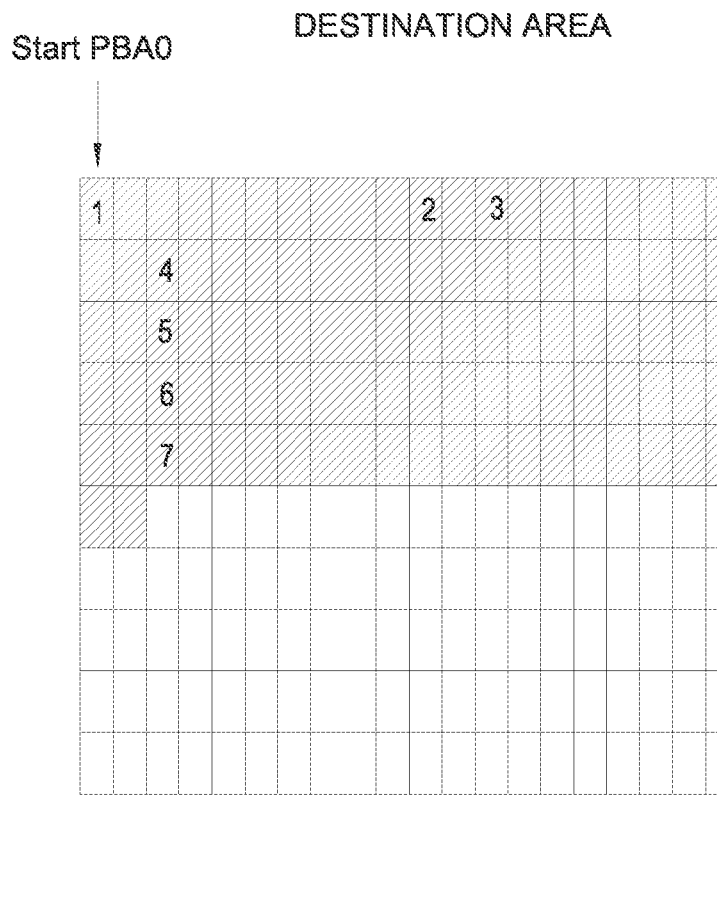
Figures 14G, 15A:
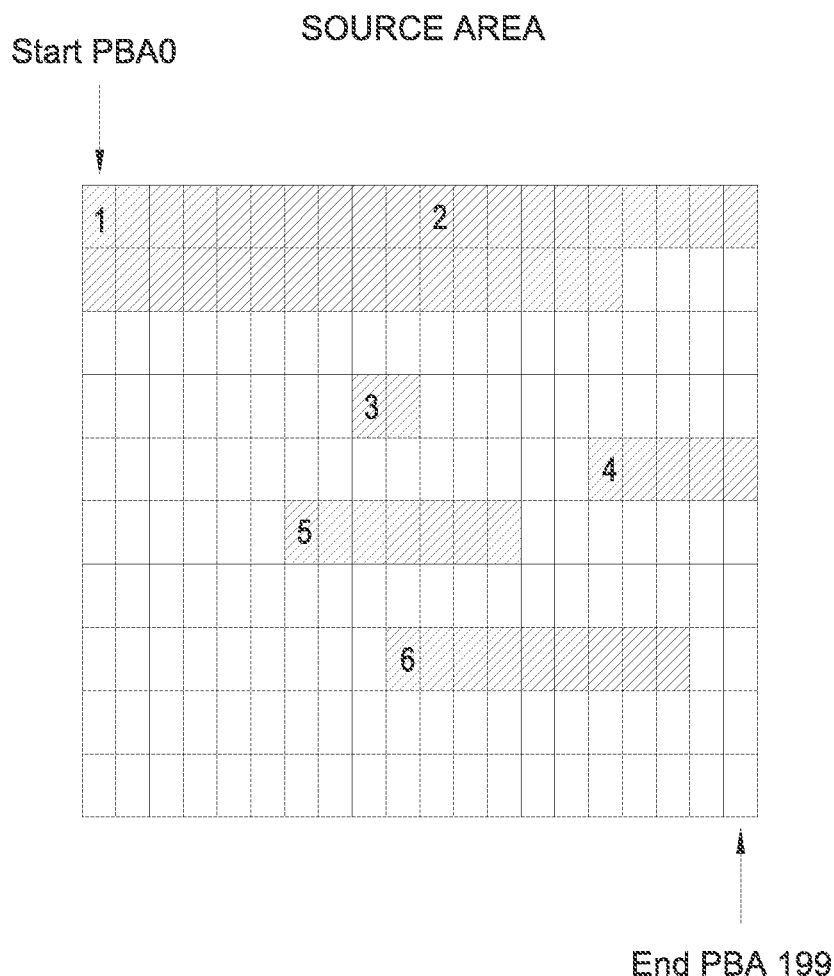

The data read and write operation controller 1302 sequentially writes the data temporarily stored in the read buffer 620-1 starting from a physical position corresponding to a first sector of the destination area of the disk 12. Accordingly, the valid data is written in the destination area of the disk 12 as shown in FIG. 14E, and the address mapping information of the destination area of the disk 12 is generated as shown in FIG. 14f. The SAT of the destination area in which the data is written as shown in FIG. 14e is generated as shown in FIG. 14g. The numbers described in FIG. 14e are information indicating a first sector of the sectors (or a sector group) in which valid data is continuously written, but the numbers are not data physically written to the disk 12. The address mapping information is on the basis of the first sector of the sectors in which data is continuously written.

When the address mapping information of the destination area and the SAT are generated by the data read and write operation controller 1302, the write state information updating unit 1303 updates the write state information 670-1 stored in the RAM 670 such that the address mapping information of the source area and the SAT as shown in FIGS. 14b and 14c is reset or cleared or has a value corresponding to a free area, and the address mapping information of the destination area generated by the data read and write operation controller 1302 and the SAT are reflected as shown in FIGS. 14f and 14g.

FIG. 15 is an example of logical address-based merging.

With reference to FIG. 15, when a source area is like as shown in FIG. 15a, address mapping information is like as shown in FIG. 15b, an SAT is like as shown in FIG. 15c, and a threshold value to be compared with the number of address mapping information items is 6 as shown in FIG. 14, since the number of address mapping information items of the source area is 6, the number (6) of the address mapping information items of FIG. 15a is not greater than the threshold value 6. The numbers indicated in FIG. 15a have the same meaning as the numbers denoted in FIGS. 14a to 14e.

Since the number (6) of the address mapping information items with respect to the source area illustrated in FIG. 15a is not greater than the threshold value 6, the merge operation selecting unit 1301 selects a merge operation with respect to the source area illustrated in FIG. 15a as logical address-based merge operation.

As shown in FIG. 14, the merge operation selecting unit 1301 may select a merge operation in consideration a value (59/6=9.83) obtained by dividing the number (59) of the sectors in which valid data is written in the source area by the number (6) of the address mapping information items. In case in which both the number (6) of the address mapping information items and the value (9,83) obtained by the division are used, when both the number of the address mapping information items of the source area and the value obtained by the division as described above are not greater than the first threshold value (6) and the second threshold value (10) mentioned in FIG. 14, the merge operation selecting unit 1301 may select the logical address-based merge operation.

However, when the number of address mapping information items is greater than the first threshold value (6) mentioned in FIG. 14 or when the value obtained by the division is greater than the second threshold value 10 mentioned in FIG. 14, the merge operation selecting unit 1301 may select the physical address-based merge operation with respect to the source area.

When the logical address-based merge operation is selected by the merge operation selecting unit 1301, the data read and write operation controller 1302 controls the components within the storage device 600a or 600b including the R/W channel 620 such that data is read from the source area of the disk 12 on the basis of the logical addresses of the address mapping information of the source area of the disk 12 of FIG. 15b.

When the size of the read buffer 620-1 is greater than the number of the sectors in which valid data in the source area of FIG. 15a, the data read and write operation controller 1302 reads the data written in the source area of the disk 12 on the basis of the logical addresses of the address mapping information of FIG. 15b and temporarily stores the read data in the read buffer 620-1 of the R/W channel 620, and sequentially writes the data temporarily stored in the read buffer 620-1 starting from a physical position corresponding to a first sector of the destination area of the disk 12.

Figures 15D, 15E:
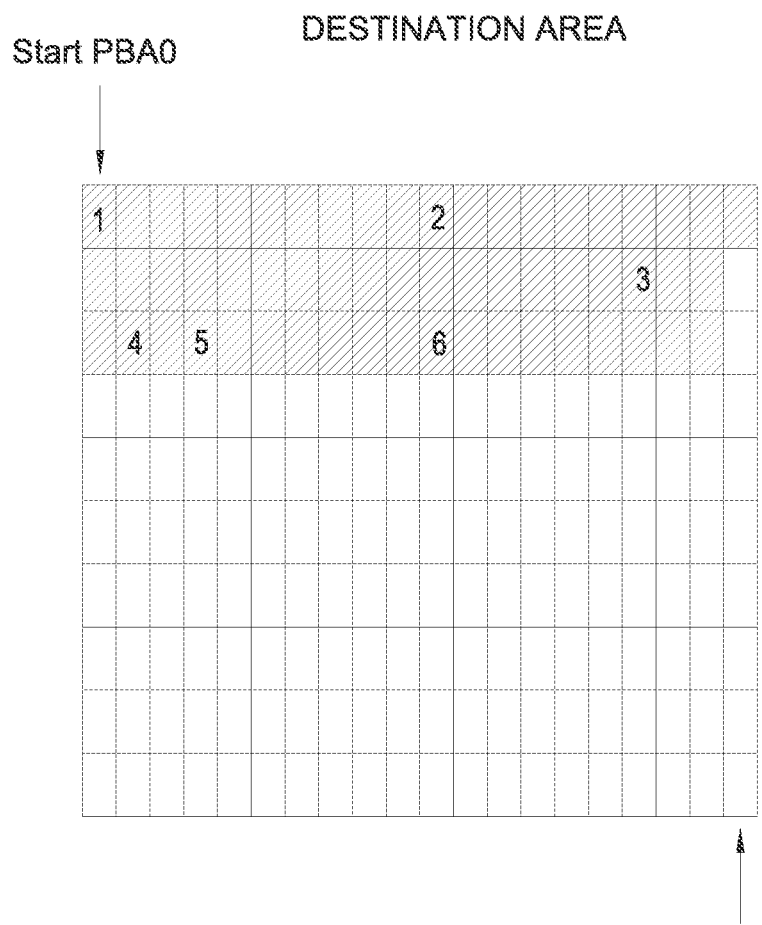

Accordingly, the data is written to the destination area of the disk 12 as shown in FIG. 15d, and the address mapping information of the destination area in which data has been written is generated as shown in FIG. 15e. In this case, since a logical block address 20 and a logical block address 46 have continued logical block addresses, merging is performed between the address mapping information in the logical block addresses 20 and 46. Thus, the address mapping information with respect to the destination area of FIG. 15d is redefined as shown in FIG. 15f, and an SAT thereof is generated as shown in FIG. 15g.

When the data read and write operation for the logical address-based merge operation as described above is completed by the data read and write operation controller 1302, the write state information updating unit 1303 updates the write state information 670-1 stored in the RAM 670 as described above in FIG. 14 in order to update the write state information of the source area and the destination area.

Meanwhile, when the size of the read buffer 620-1 corresponds to 50 sectors, when physical address-based merging is performed on the source area as shown in FIG. 14a, the data read and write operation controller 1302 reads the data in units of 50 sectors from the source area of the disk 12 by using the address mapping information sorted on the basis of the physical addresses as shown in FIG. 14d.

Thus, the data read and write operation controller 1302 redefines the address mapping information of FIG. 14d sorted on the basis of the physical addresses in units of 50 sectors. Accordingly, split mapping information may be generated from PBA 106 among address mapping information of FIG. 14d may be generated. The split mapping information is address mapping information generated as the sectors are divided according to the size of the read buffer 620-1 and may be referred to as a split key. Thus, the split mapping information is on the basis of the number of divided sectors. The address mapping information with respect to the source area of FIG. 14a including the generated split mapping information is as shown in FIG. 16a.

Figure 16B:
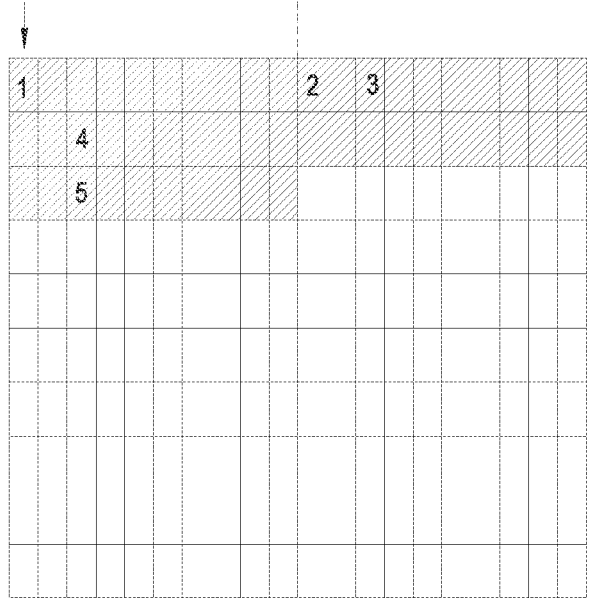

The data read and write operation controller 1302 first reads data from the source area of the disk 12 on the basis of the physical addresses of the address mapping information of 1601 among the address mapping information of FIG. 16a, temporarily stores the read data in the read buffer 620-1, and writes the data temporarily stored in the read buffer 620-1 to the destination area of the disk 12. Accordingly, the valid data as shown in FIG. 16b is written to the destination area of the disk 12.

Figure 16C:
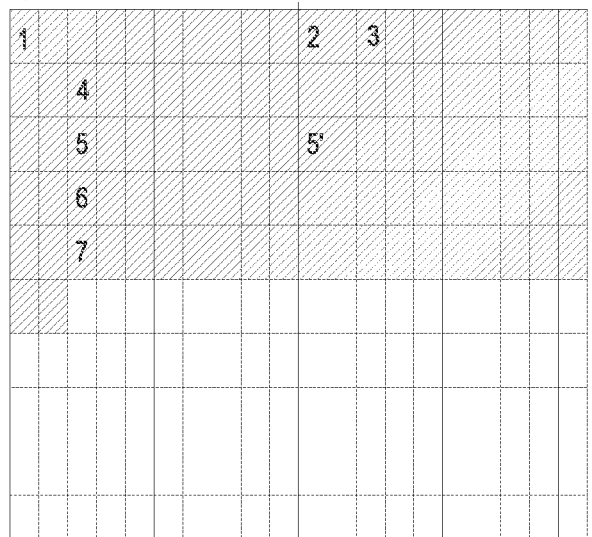

Next, the data read and write operation controller 1302 reads data from the source area of the disk 12 on the basis of the physical addresses of the address mapping information of the address mapping information 1602 of FIG. 16a, temporarily stores the read data in the read buffer 620-1, and writes the data temporarily stored in the read buffer 620-1 to the destination area of the disk 12. Accordingly, the valid data as shown in FIG. 16c is written to the destination area of the disk 12. The sector indicated by 5' in FIG. 16c is a sector corresponding to the split mapping information (LBA 30, Scts 12, PBA 114) of the address mapping information of FIG. 16a.

The address mapping information regarding the destination area as shown in FIG. 16c is defined as shown in FIG. 16d. The address mapping information (LBA 30, Scts 12, PBA 50) indicated by 5' in FIG. 16d is on the basis of the split mapping information.

Thus, since the logical addresses of the address mapping information (LBA 30, Scts 12, PBA 50) indicated by 5' in FIG. 16d and that of the previous mapping address information (LBA 22, Scts 8, PBA 42) are continued, so merging is performed between the mapping information. Thus, the data read and write operation controller 1302 may redefine the address mapping information regarding the destination area in which the valid data is written as shown in FIG. 16e.

Thus, since the logical addresses of the address mapping information (LBA 30, Scts 12, PBA 50) indicated by 5 in FIG. 16d and that of the previous mapping address information (LBA 22, Scts 8, PBA 42) are continued, so merging is performed between the mapping information. Thus, the data read and write operation controller 1302 may redefine the address mapping information regarding the destination area in which the valid data is written as shown in FIG. 16e.

When the operation of writing the data, which has been read from the source area, is completed, the write state information updating unit 1303 updates the address mapping information of the destination area under the control of the data read and write operation controller 1302 as shown in FIG. 16e, and update the write state information 670-1 stored in the RAM 670 such that the address mapping information of the source area is reset, cleared, or set as the address mapping information of a free area.

When the source area is as shown in FIG. 15a and the size of the read buffer 620-1 is 50 sectors, the data read and write operation controller 1302 may redefine the address mapping information as shown in FIG. 15b according to the size of the read buffer 620-1. However, in the case of the address mapping information of FIG. 15b, since even the number of sectors following the address mapping information (LBA 82, Scts 7 PBA 106) corresponds to 50 sectors, the split mapping information mentioned in FIG. 16 is not generated. Thus, the address mapping information of FIG. 15b is not redefined. However, when data is read by using the read buffer 620-1 having a size of 50 sectors, valid data corresponding to a section from the address mapping information LBA0 to LBA 82 is read, the read data is written to the destination area of the disk 12, and then, data is read again from the source area of the disk 12 on the basis of the address mapping information LBA 101 of FIG. 15b, the read data is temporarily stored in the read buffer 620-1, and then, written to the destination area of the disk 12.

Figures 17A, 17B, 17C:
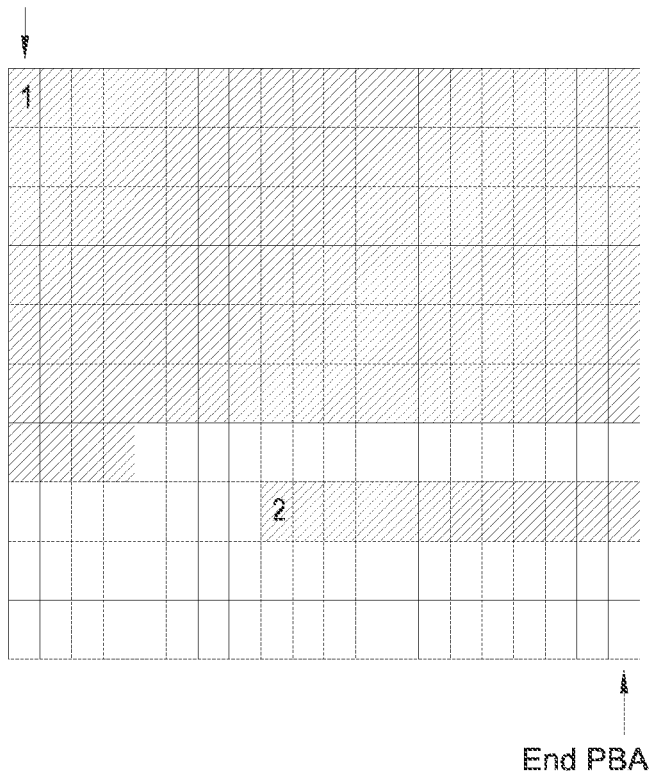

Meanwhile, when the source area is as shown in FIG. 17a and the size of the read buffer 620-1 is 100 sectors, the data read and write operation controller 1302 generates split mapping information with respect to the address mapping information as shown in FIG. 17b. Thus, the address mapping information as shown in FIG. 17b is redefined as shown in FIG. 17c.

Figure 17D:
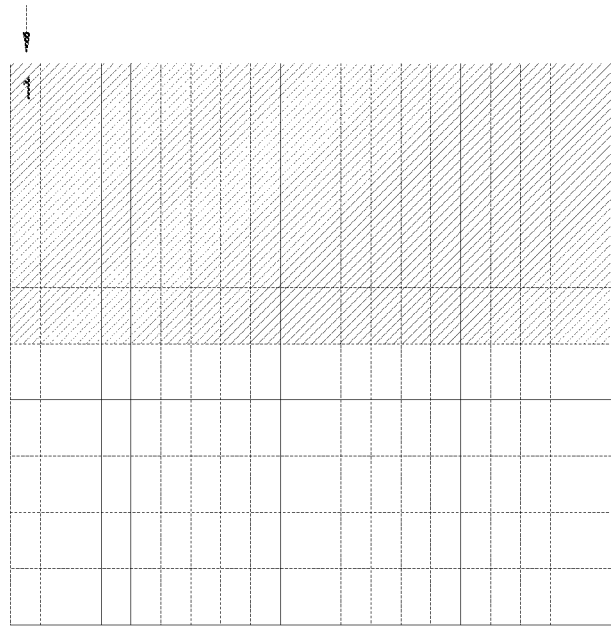

On the basis of the logical addresses of the address mapping information (LBA2 Scts 100 PBA 0) of FIG. 17c, the data read and write operation controller 1302 reads data from the source area of the disk 12 and temporarily stores the read data in the read buffer 620-1. The data read and write operation controller 1302 writes the data temporarily stored in the read buffer 620-1 to the destination area of the disk 12. Accordingly, the data as shown in FIG. 17d is written to the destination area of the disk 12.

Figure 17E:
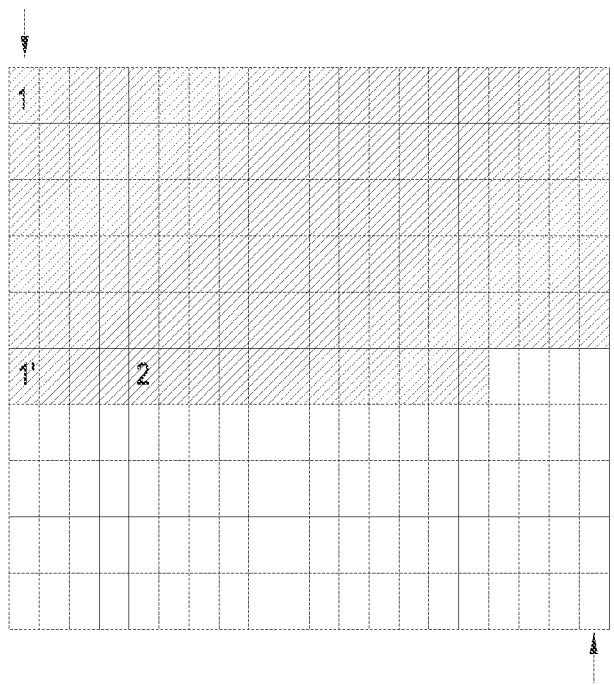

And then, on the basis of the logical addresses of address mapping information (LBA 102 Scts 4 PBA 100, LBA 120 Scts 12 PBA 128) of FIG. 17c, the data read and write operation controller 1302 reads the data from the source area of the disk 12, temporarily stores the read data in the read buffer 620-1, and writes the data stored in the read buffer 620-1 to the destination area of the disk 12. Accordingly, in the destination area of the disk 12, data is written starting from a sector that follows the last sector in which data was written in FIG. 17d, so as to be written as shown in FIG. 17e. The sector indicated by 1' in FIG. 17e indicates that it is a sector corresponding to the split mapping information of FIG. 17c.

The address mapping information of the destination area as shown in FIG. 17e is defined as shown in FIG. 17f. However, since the address mapping information LBA2 and LBA102 have continued logical addresses, merging is performed between the address mapping information. Thus, the address mapping information with respect to the destination area of FIG. 17f is redefined as shown in FIG. 17g. The write state information updating unit 1303 updates the write state information 670-1 of the RAM 670 such that the address mapping information of the destination area is defined as shown in FIG. 17g and the address mapping information of the source area is reset, cleared, or defined as address mapping information corresponding to the free area.

Figure 18:
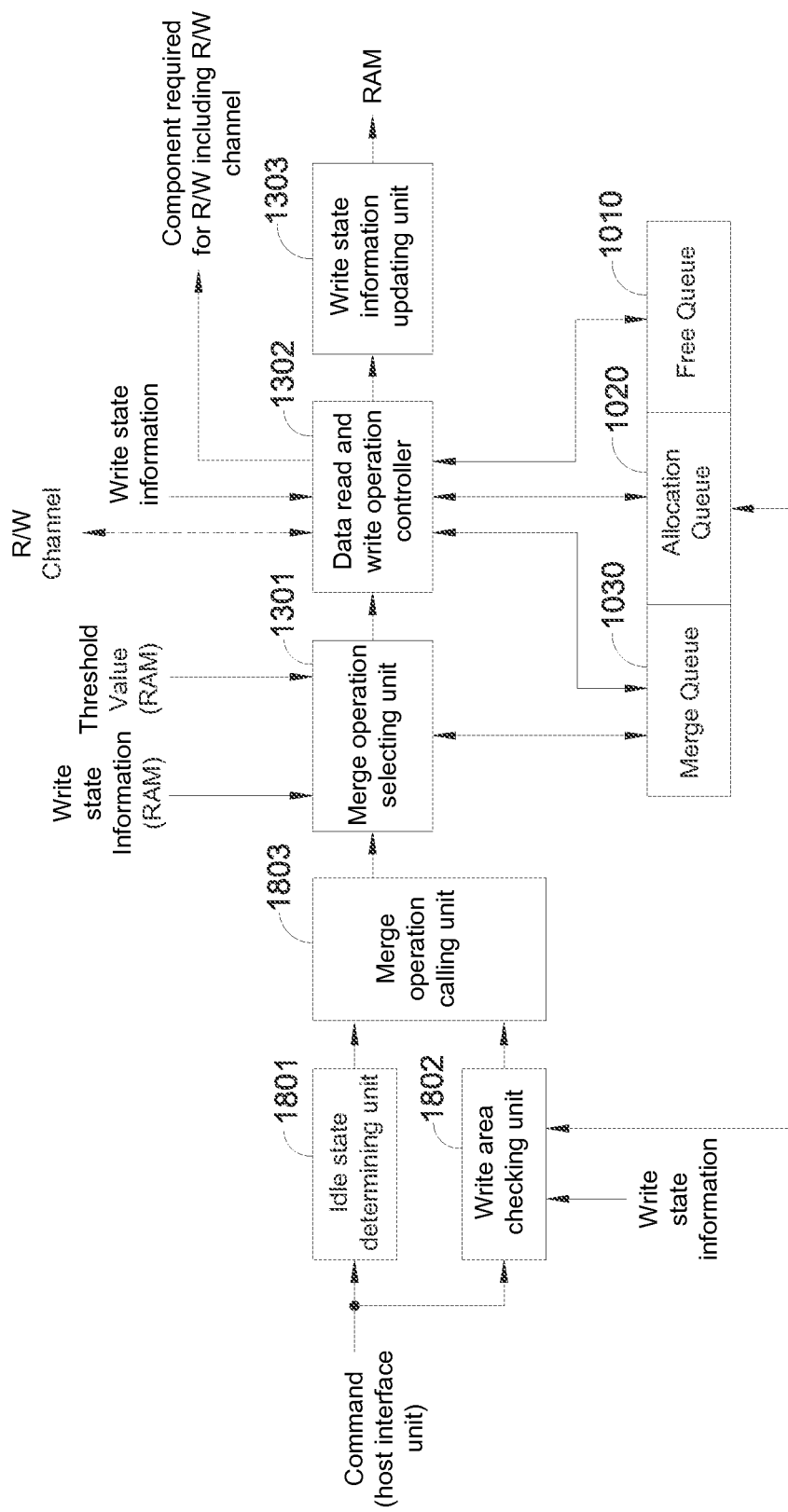
FIG. 18 is a view showing another example of a configuration of a processor included in the storage according to a preferred embodiment of the present invention.

FIG. 18 is a view showing another example of a configuration of a processor included in the storage according to a preferred embodiment of the present invention. FIG. 18 also explains an example performed by the processor 630. However, the processor 121 illustrated in FIG. 1 may also perform the following operation.

With reference to FIG. 18, the processor 630 includes an idle state determining unit 1801, a write area checking unit 1802, a merge operation calling unit 1803, a free queue 1010, an allocation queue 1020, a merge queue 1030, a merge operation selecting unit 1301, a data read and write operation controller 1302, and a write state information updating unit 1303, but not limited thereto. For example, the idle state determining unit 1801, the write area checking unit 1802, and the merge operation calling unit 1803 illustrated in FIG. 18 may be configured as a single component.

The idle state determining unit 1801 determines whether an operation state of the storage device 600a is an idle state. In this embodiment, the idle state determining unit 1801 checks whether a command is received from the host interface unit 680, and when a command is not received, the idle state determining unit 1801 determines that the operation state of the storage device 600a as an idle state. However, the determining whether the operation state of the storage device 600a is an idle state is not limited to the determining whether the foregoing command is received. When the operation state of the storage device 600a is determined to be an idle state, the idle state determining unit 1801 outputs a signal indicating an idle state.

When a write command is received through the host interface unit 680, the write area checking unit 1802 may check whether an area to be written is insufficient on the basis of the number of LBAs and sectors in which data is to be written included in the write command, information stored in the allocation queue 1020, and the write state information 670-1 read from the RAM 670. Checking whether an area to be written is insufficient will be described in detail later in FIGS. 25 and 26. Checking whether an area to be written is insufficient may be interpreted to include checking whether there is no area to be written According to the checking results, when it is determined that an area to be written is insufficient, the write area checking unit 1802 outputs a signal indicating that an area to be written is insufficient.

When the signal indicating an idle state is output from the idle state detection unit 1801 or when a signal indicating that an area to be written is insufficient is output from the write area checking unit 1802, the merge operation calling unit 1803 generates a merge request signal for calling a merge operation.

When the merge request signal is generated from the merge operation calling unit 1803, the merge operation selecting unit 1301 selects a source area to be merged on the basis of the information stored in the merge queue 1030 and reads the write state information of the source area selected from among the write state information 670-1 stored in the RAM 670 and a threshold value stored in the RAM 670 on the basis of identification information of the selected source area to select a merge operation as described above with reference to FIG. 13. The merge operation selecting unit 1301 transmits information regarding the selected merge operation to the data read and write operation controller 1302.

When the information regarding the selected merge operation is received from the merge operation selecting unit 1301, the data read and write operation controller 1302 selects a source area and a destination area to be merged on the basis of the information stored in the merge queue 1030 and the free queue 1010, and reads a write state information of the source area and the destination area from the write state information 670-1 of the RAM 670 on the basis of the identification information of the selected source area and destination area, respectively. The data read and write operation controller 1302 reads data from the source area of the disk 12 and writes the read data to the destination area of the disk 12 as described above with reference to FIG. 13 by using the read write state information.

When the operation of writing the data, which has been read from the source area of the disk 12, to the destination area of the disk 12 is completed, the data read and write operation controller 1302 updates the information stored in the merge queue 1030, the allocation queue 1020, and the free queue 1010 as described above with reference to FIG. 12, and requests updating of the write state information of the source area and the destination area from the write state information updating unit 1303. Then, the write state information updating unit 1303 updates the write state information of the source area and the destination area included in the write state information 670-1 stored in the RAM 670 as described above with reference to FIG. 13.

An operation of executing the method for merging data written in a storage medium according to the flow charts of FIGS. 19 to 23, FIGS. 27 to 29, and FIG. 31, and the method for controlling a write operation on a storage medium according to the flow charts of FIGS. 24 and 25 by the processor 121 and 630 by using the program codes and information loaded to the RAM 122 or 670 will be described. Hereinafter, for the sake of explanation, the example of performing by the processor 630 illustrated in FIGS. 6a and 6b will be described, but the following operation may also be performed by the processor 121 illustrated in FIGS. 1a and 1b.

Figure 19:
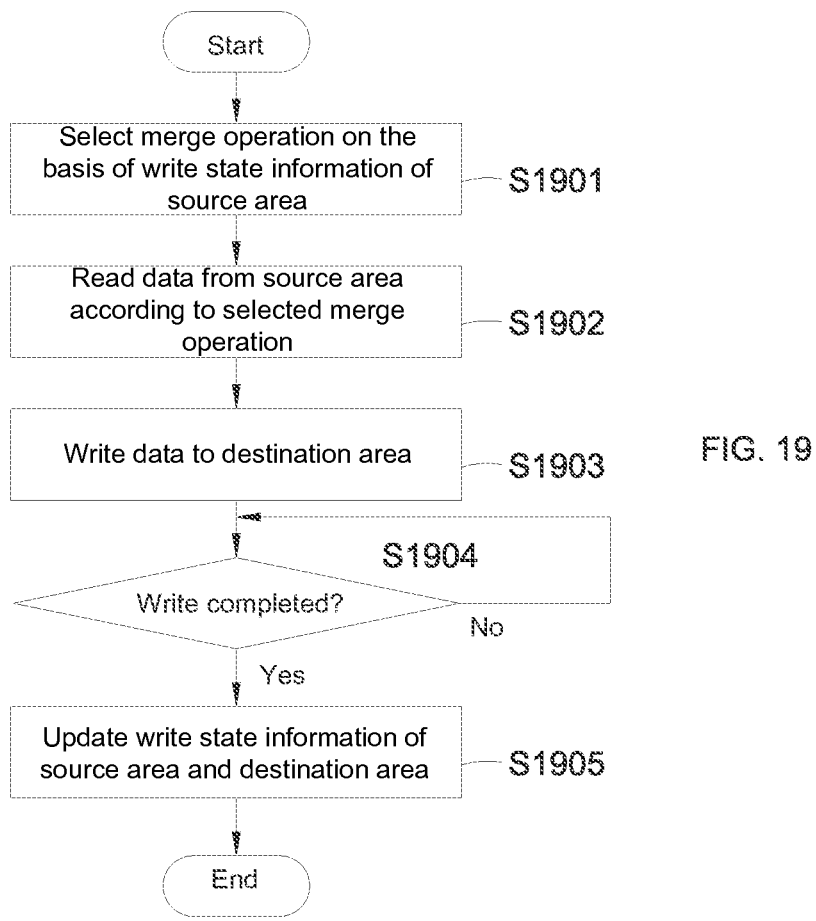
FIG. 19 is a view showing an example of a flow chart of an operation of a method of merging data written in a storage medium according to a preferred embodiment of the present invention.

FIG. 19 is a view showing an example of a flow chart of an operation of a method of merging data written in a storage medium according to a preferred embodiment of the present invention.

The processor 630 selects one of physical address-based merge operation and logical address-based merge operation on the basis of write state information with respect to a source area of the disk 12 among the write state information 670-1 stored in the RAM 670 (S1901).

Figure 20:
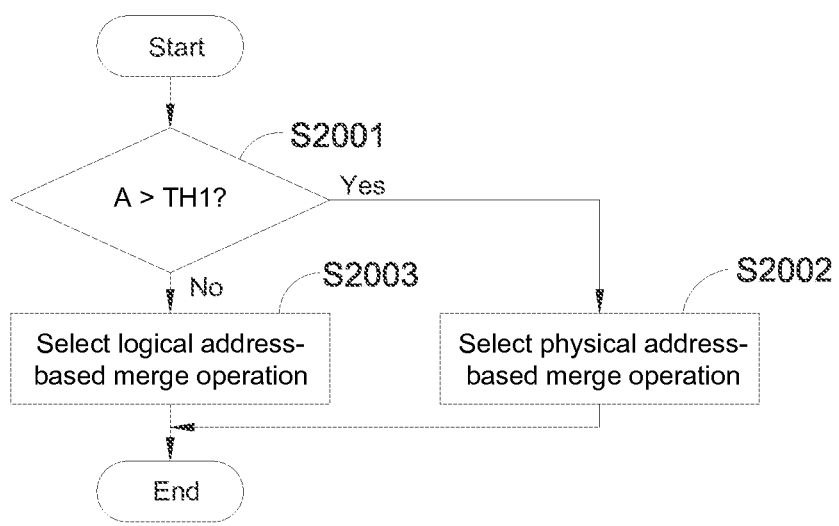
FIG. 20 is a view showing an example of a flow chart of an operation regarding a selection of a merge operation illustrated in FIG. 19.

FIG. 20 is a view showing an example of a flow chart of an operation regarding a selection of a merge operation illustrated in FIG. 19. Specifically, FIG. 20 shows an example on the basis of the number (A) of address mapping information items.

The number (A) of address mapping information items is a number of address mapping information items obtained by mapping physical addresses of a source area and logical addresses received when data is written to the source area. In case of FIG. 14a, the number of address mapping information items is 7 (A=7), and in case of FIG. 15a, the number of address mapping information items is 6 (A=6). TH1 is a threshold value to be compared with the number of address mapping information items, and it is compared with the number (A) of the address mapping information items mentioned in FIGS. 13 to 17. Thus, the number (A) of the address mapping information items is detected from write state information of the source area read from the write state information 670-1 of the RAM 670 and the threshold value TH1 is read from the RAM 670.

The processor 630 compares the number (A) of address mapping information items of the source area to the threshold value TH1 (S2001). Upon comparison, when the number (A) of address mapping information items is greater than the threshold value TH1, the processor 630 selects physical address-based merge operation with respect to the source area (S2002).

However, according to the comparison results in step S2001, when the number (A) of address mapping information items is not greater than the threshold value TH1, the processor 630 selects logical address-based merge operation with respect to the source area (S2003).

Figure 21:
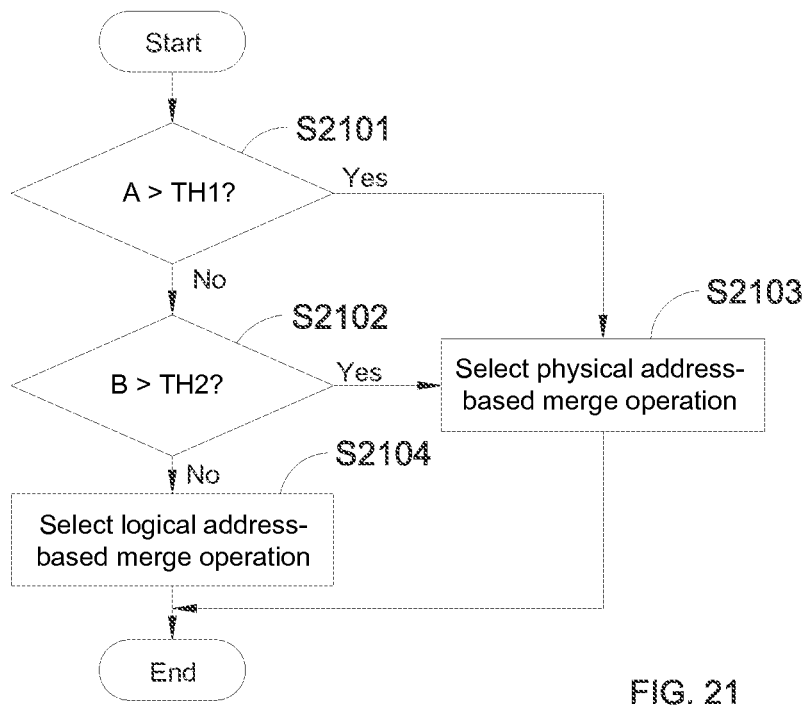
FIG. 21 is a view showing another example of a flow chart of an operation regarding a selection of a merge operation illustrated in FIG. 19.

FIG. 21 is a view showing another example of a flow chart of an operation regarding a selection of a merge operation illustrated in FIG. 19. Specifically, FIG. 21 shows an example on the basis of the number (A) of the address mapping information items and a value (SN/A=B) obtained by dividing and the number (SN) of the sectors in which valid data is written by the number (A) of address mapping information items.

When the number (A) of the address mapping information items is greater than the first threshold value TH1 or when the value (B) obtained by dividing the number (SN) of the sectors in which valid data is written in the source area by the number (A) of address mapping information items is greater than the second threshold value TH2, the processor 630 selects physical address-based merge operation (S2101, S2102, S2103). The first threshold value TH1 and the second threshold value TH2 are the same as the first threshold value and the second threshold value mentioned in FIGS. 13 to 17.

When the number (A) of the address mapping information items of the source area is not greater than the first threshold value TH1 and the value (B) obtained by the division is not greater than the second threshold value TH2, the processor 630 selects the logical address-based merge operation (S2101, S2102, and S2104).

FIG. 22 is a view showing another example of a flow chart of an operation regarding a selection of a merge operation illustrated in FIG. 19. Specifically, FIG. 22 shows an example on the basis of a value (SN/A=B) obtained by dividing the number (SN) of the sectors in which valid data is written by the number (A) of address mapping information items.

When the value (B) obtained by the division is greater than the threshold value TH2, the processor 630 selects the physical address-based merge operation (S2201, S2202).

However, when the value (B) obtained by the division is not greater than the second threshold value TH2, the processor 630 selects the logical address-based merge operation (S2201, S2203).

With reference to FIG. 19, the processor 630 reads data from the source area of the disk 12 according to a merge operation selected in step S1901 (S1902). Namely, when the selected merge operation is the physical address-based merge operation, the processor 630 reads data from the source area by using physical addresses included in the address mapping information of the source area of the disk 12. Meanwhile, when the selected merge operation is the logical address-based merge operation, the processor 630 reads data from the source area by using logical addresses included in the address mapping information of the source area of the disk 12. To this end, the processor 630 controls the components required for reading data in the storage device 600a or 600b including the R/W channel 620 in such a manner as described in FIGS. 6a, 6b, 13, and 18.

Namely, when the selected merge operation is the physical address-based merge operation, the processor 630 sorts the address mapping information of the source area on the basis of physical addresses and reads data from the source area by using physical addresses included in the sorted address mapping information as describe above with reference to FIGS. 14 and 16. Here, split mapping information may be generated according to the size of the read buffer 620-1 as described above. When the selected merge operation is the logical address-based merge operation, the processor 630 reads data from the source area by using logical addresses included in the sorted address mapping information with respect to the source area of the disk 12 as describe above with reference to FIGS. 15 and 17. Here, split mapping information may be generated according to the size of the read buffer 620-1 as described above in FIG. 17.

The processor 630 controls the components required for writing within the storage device 600a or 600b including the R/W channel 620 in such as manner as described with reference to FIGS. 6a, 6b, 13, and 18 such that the read data is sequentially written starting from a physical position corresponding to a first sector of a destination area of the disk 12 (S1903).

With reference to FIG. 19, when the operation of writing the data, which has been read from the source area, to the destination area in step S1903 is completed (S1904), the processor 630 updates the write state information of the source area and the write state information of the destination area among the write information 670-1 stored in the RAM 670 (S1905).

Steps S1903 to S1905 illustrated in FIG. 19 may be defined to be included in step S1903. Namely, while the data, which has been read from the source area, to the destination area, the write state information of the source area and the destination area among the write state information 670-1 of the RAM 670 may be updated.

After the merge operation is performed as shown in FIG. 19, the source area may be set as a free area (or free band) at a certain point in time. In general, the certain point in time may be a point in time at which a free area with respect to the disk 12 is required of a point in time at which a merge operation is completed, but the present invention is not limited thereto.

FIG. 23 is a view showing another example of a flow chart of an operation of a method of merging data written in a storage medium according to an embodiment of the present invention. Specifically, FIG. 23 shows an example in which when the storage device 600a is in an idle state, a data merge method is performed as illustrated in FIG. 19.

A processor 630 determines whether the storage device 600a is in an idle state (S2301). The determining whether an operation state of the storage device 600a is an idle state may be performed in such manner as described above by the idle state determining unit 1801 in FIG. 18.

When it is determined that the operation state of the storage device 600a is an idle state, the processor 630 performs the operations as described above in steps S1901 to S1905 in FIG. 19 described in steps S2302 to S2306.

However, when it is determined that the operation state of the storage device 600a is not an idle state, the processor 630 may terminate the operation without performing a merge operation according to steps S2302 to S2306.

FIG. 24 is a flow chart of an operation regarding a method for controlling a write operation on a storage medium according to another embodiment of the present invention. Specifically, FIG. 24 shows an example of a flow chart of an operation of a method for controlling a write operation in which the storage device 600a can perform merging of data written to the disk 12 when a write command is received from the host device 110. Data merging performed when the write command is received may be referred to as force merging.

When a write command is received from the host device 110, the processor 630 determines whether a write-available area is insufficient (S2401). Determining whether write-available area is insufficient may be performed on the basis of the number of sectors of data to be written according to the received write command, the number of currently remaining sectors, and the number of free areas.

FIG. 25 is a view showing an example of a detailed flow chart of an operation for determining whether a write-available area illustrated in FIG. 24 is insufficient.

With reference to FIG. 25, the processor 630 determines whether a write-available area of the current area is insufficient (S2501).

Figure 26:
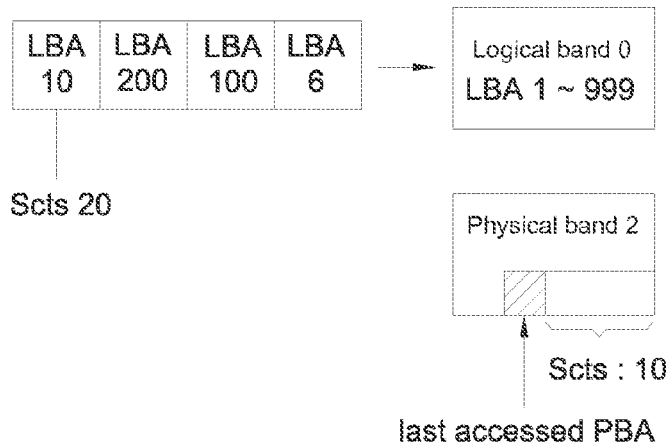
FIG. 26 is a view showing an example of a process for determining whether a write-available area of a current area is insufficient in another preferred embodiment of the present invention.

FIG. 26 is a view showing an example of a process for determining whether a write-available area of a current area is insufficient in another preferred embodiment of the present invention. Specifically, FIG. 26 shows an example in which a write-available area of a current area is insufficient.

With reference to FIG. 26, the current area is a currently used physical band among physical bands of the disk 12 allocated to a logical band (logical band 0 in FIG. 26) corresponding to logical block addresses included in the currently received write command. The currently used physical band may be known on the basis of information allocated to the allocation queue 1020.

In FIG. 26, when the logical block addresses of the currently received write command is 10 and information regarding the number of sectors received together with the received LBAs is 20, since the number of sectors available for write in the current area is 10, the processor 630 determines that a write-available area of the current area is insufficient.

The number of sectors on the basis of the LBAs of the received write command may be detected on the basis of the received write command. The number of write-available sectors in the physical band 2 may be detected on the basis of write state information of the physical band 2 read from the write state information 670-1. For example, when the last accessed physical block address (PBA) of the physical band 2 is subtracted from the total number of sectors of the physical band 2, the number of sectors available in the physical band 2 can be known. The foregoing arithmetic operation may b performed by the processor 630.

When it is determined that a write-available area of the current area is insufficient, the processor 630 determines whether or not the number of free areas is greater than a threshold value TH3 (S2503). The number of free areas may be determined on the basis of the number of areas stored in the free queue 1010. The free areas may be managed by unit illustrated in FIG. 7. The threshold value TH3 may be stored in the maintenance cylinder area of the disk 12 of the ROM 660 beforehand on the basis of a maximum number of available bands, and when the write command is received one time, the threshold value TH3 may be loaded to the RAM 670 by the processor 630 so as to be used. For example, the threshold value TH3 may be set to be 3.

When the number of free areas is greater than the threshold value TH3, the processor 630 may determine that a write-available area is sufficient for the received write command. Namely, the processor 630 may determine that there is an area for writing with respect to the received write command.

When the write-available area of the current area is not insufficient or when the write-available area of the current area is insufficient but the number of free areas is sufficient, the processor 630 performs step S2407 (S2502). However, when the write-available area of the current area is insufficient or when the number of free areas is not greater than the threshold value TH3, the processor 630 determines that the write-available area is insufficient and perform step S2402 (S2504).

Thus, the processor 630 performs the operation corresponding to steps S1901 and S1902 in FIG. 19 in steps S2402 to S2404 to read data from the source area of the disk 12. Next, the processor 630 performs a write operation according to the received write command, while performing a merge operation of writing the data read from the source area to a destination area of the disk 12 (S2404).

Here, the write operation according to the received write command performs to write starting from a sector having a next PBA of the last accessed PBA of the destination area for which a write operation has been completed by a merge operation. When data is written to every available sector of the destination area so a write-available area is additionally required, the processor 630 may select a free area on the basis of the information stored in the free queue 1010 and write data continuously to the selected free area.

When it is determined that the write operation has been completed in step S2404, the processor 630 updates the write state information of the source area and the destination area (S2405, S2406).

Meanwhile, when it is determined that the write-available area is not insufficient in step S2401 in FIG. 24, the processor 630 performs an operation of writing data according to the received write command, starting from a write-available sector of the current area (S2407).

Figure 27:
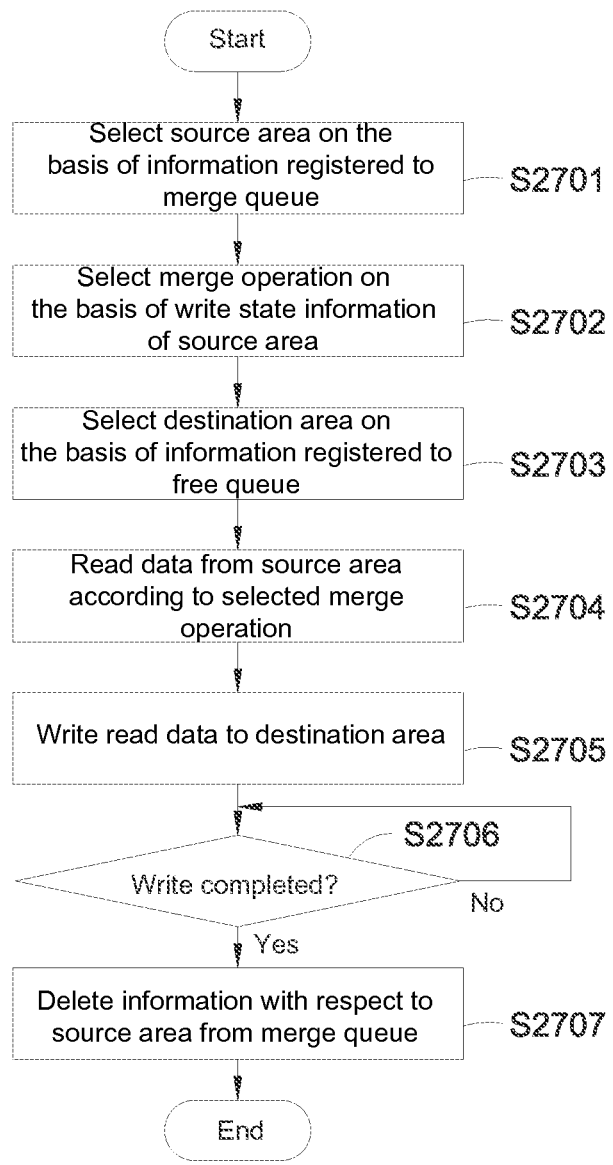
FIG. 27 is a view showing another example of a flow chart of an operation of a method of merging data written in a storage medium according to a preferred embodiment of the present invention.

FIG. 27 is a view showing another example of a flow chart of an operation of a method of merging data written in a storage medium according to a preferred embodiment of the present invention. Specifically, FIG. 27 shows an example including an operation using the merge queue 1030 and the free queue 1010.

With reference to FIG. 27, the processor 630 selects a source area to be merged on the basis of information regarding a merge standby area registered to the merge queue 1030 (S2701). As the source area, an area having the greatest number of invalid sectors (sector count) among the areas registered to the merge queue 1030, or an area may be selected in order of areas which have been registered to the merge queue 1030.

In step S2702, the processor 630 may select a merge operation on the basis of write state information read from the write state information 670-1 as in step S1901 of FIG. 19. The processor 630 selects a destination area on the basis of the information registered to the free queue 1010 (S2703). The selecting of a destination area on the basis of the information registered to the free queue 1010 may be performed in order of areas registered to the free queue 1010 or on the basis of identification numbers allocated to respective areas (or bands).

The processor 630 performs steps S2704 and S2705 corresponding to steps S1902 and S1903 of FIG. 19 to write the data which has been read from the source area of the disk 12 to the destination area of the disk 12.

When the write operation on the destination area of the disk 12 according to the merge operation is completed (S2706), the processor 630 deletes information regarding the source area from the merge queue 1030 (S2702).

The processor 630 may manage information stored in the free queue 1010, the allocation queue 1020, and the merge queue 1030 such that the disk 12 can have at least one source area to be merged and a plurality of free areas. The information management may be performed by unit illustrated in FIG. 7 or may be performed by the disk 12.

Figure 28:
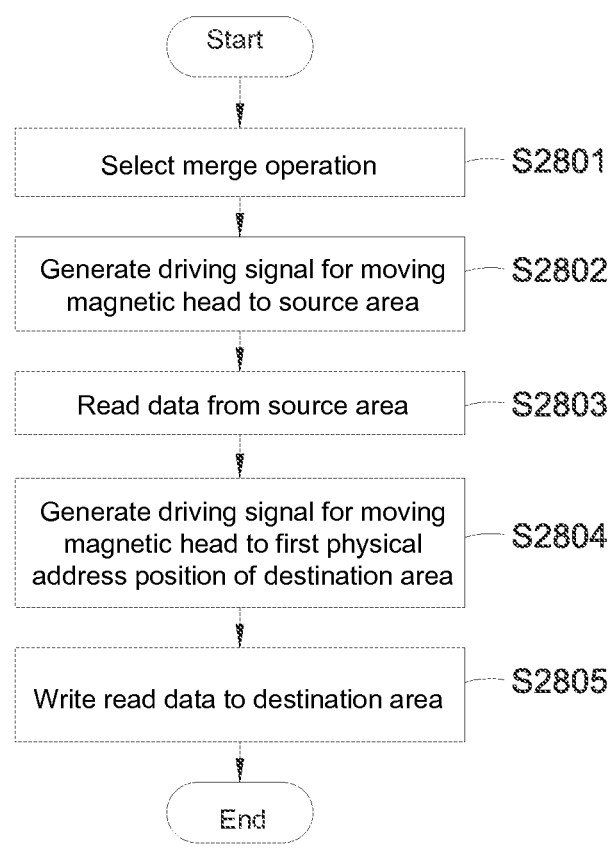
FIG. 28 is a view showing another example of a method of merging data written in a storage medium according to a preferred embodiment of the present invention.

FIG. 28 is a view showing another example of a method of merging data written in a storage medium according to a preferred embodiment of the present invention. Specifically, FIG. 28 is a detailed flow chart of the operation of the method for merging data written in the disk 12 illustrated in FIG. 12.

When a merge request signal is generated according to performing of functions corresponding to the idle state determining unit 1801, a write area checking unit 1802, and a merge operation calling unit 1803, the processor 630 selects a merge operation on the basis of the write state information regarding the source area to be merged of the disk 12 read from the write state information 670-1 stored in the RAM (S2801). The selecting of the merge operation may be performed as described above with the merge operation selecting unit 1301 in FIGS. 13 and 18.

When a merge operation is selected, the processor 630 generates a driving signal for moving the magnetic head 16 by using any one of physical addresses and logical addresses included in the address mapping information of the source area (S2802).

Namely, when the selected merge operation is physical address-based merge operation, the processor 630 generates a driving signal for moving the magnetic head 16 to the source area by using the physical addresses included in the address mapping information of the source area. Meanwhile, when the selected merge operation is logical address-based merge operation, the processor 630 generates a driving signal for moving the magnetic head 16 to the source area by using the logical addresses included in the address mapping information of the source area.

When the magnetic head 16 moves to a physical position of the source area of the disk 12 according to the driving signal, the magnetic head 16 reads data from the physical position with respect to the source area of the disk 12 (S2803). The read data may be temporarily stored in the read buffer 620-1 as described above.

Next, the processor 630 generates a driving signal for moving the magnetic head 16 to a physical position of a first sector with respect to a destination area of the disk 12 selected for a merge operation (S2804). Accordingly, when the magnetic head 16 moves to the physical position of the first sector of the destination area of the disk 12, the processor 630 sequentially writes the data which has been read from the source area, starting from the first sector of the destination area of the disk 12 (S2805).

Figure 29:
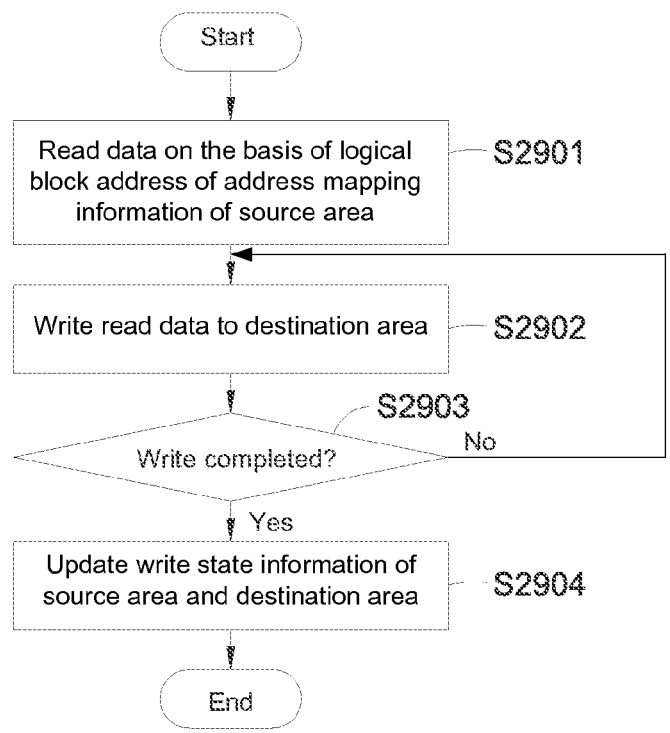
FIG. 29 is a view showing another example of a method of merging data written in a storage medium according to a preferred embodiment of the present invention.

FIG. 29 is a view showing another example of a method of merging data written in a storage medium according to a preferred embodiment of the present invention. Specifically, FIG. 29 is a flow chart of an operation of the method for merging on the basis of logical block addresses.

The processor 630 reads valid data written in the source area in units of logical block addresses LBA on the basis of the address mapping information regarding the source area of the disk 12 (S2901). Namely, as described above with reference to FIGS. 15 and 17, valid data written in the source area is read in order of logical block addresses included in the address mapping information as described above with reference to FIGS. 15 and 17.

The processor 630 sequentially writes the valid data read from the source area of the disk 12, starting from a first sector of the destination area of the disk 12 as described above with reference to FIGS. 15 and 17 (S2902).

When the operation of writing the data, which has been read from the source area, to the destination area is completed (S2903), the processor 630 updates write state information of the source area and the destination area (S2904).

Figure 30:
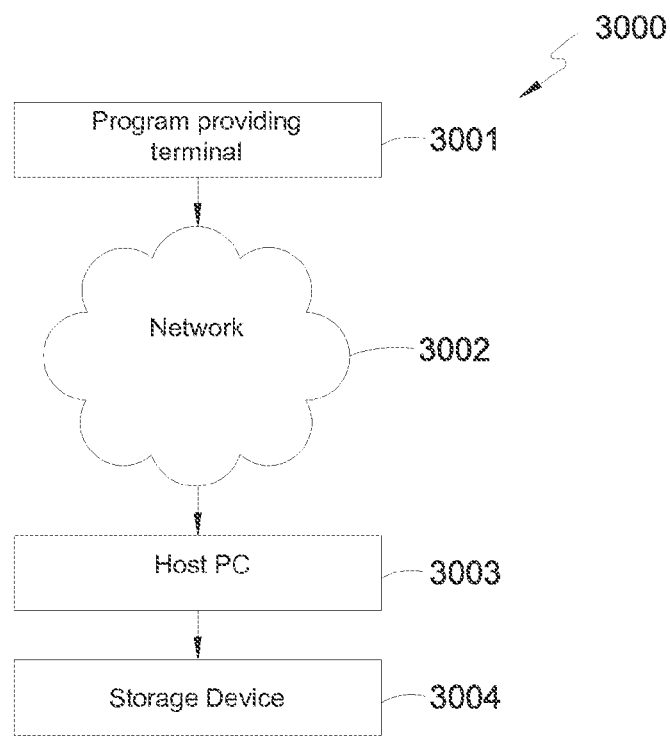
FIG. 30 is a view showing an example of a block configuration of a network system for performing a method of merging data written in a storage medium according to a preferred embodiment of the present invention.

FIG. 30 is a view showing an example of a block configuration of a network system for performing a method of merging data written in a storage medium according to a preferred embodiment of the present invention.

With reference to FIG. 30, a network, system 3000 includes a program providing terminal 3001, a network 3002, a host PC 3003, and a storage device 3004.

The program providing terminal 3001 stores a program for merge processing used to execute merging of data written on the storage medium 124 or the disk 12 according to the preferred embodiments of the present invention illustrated in FIGS. 19 to 25 and FIGS. 27 to 29, and a write operating program used to execute an operation of writing data with respect to the storage medium 124 of the disk 12. The program providing terminal 3001 performs a process of transmitting a merge program and a data write operating program to the host PC 3003 according to a program transmission request from the host PC 3003 connected through the network 3002.

The network 3002 may be implemented as a wired or wireless communication network. When the network 3002 is implemented as a communication network such as the Internet, the program providing terminal 3001 may be a Website.

The host PC 3003 may include hardware and software for performing an operation of downloading a program for merging data written in a storage medium according to a preferred embodiment of the present invention and a program for a method for controlling a write operation on a storage medium.

The host PC 3003 may execute the merge method and write operation control method according to preferred embodiments of the present invention in the storage device 3004 on the basis of the method illustrated in FIGS. 19 to 25 and FIGS. 27 to 29 according to the program downloaded from the program providing terminal 3001

Figure 31:
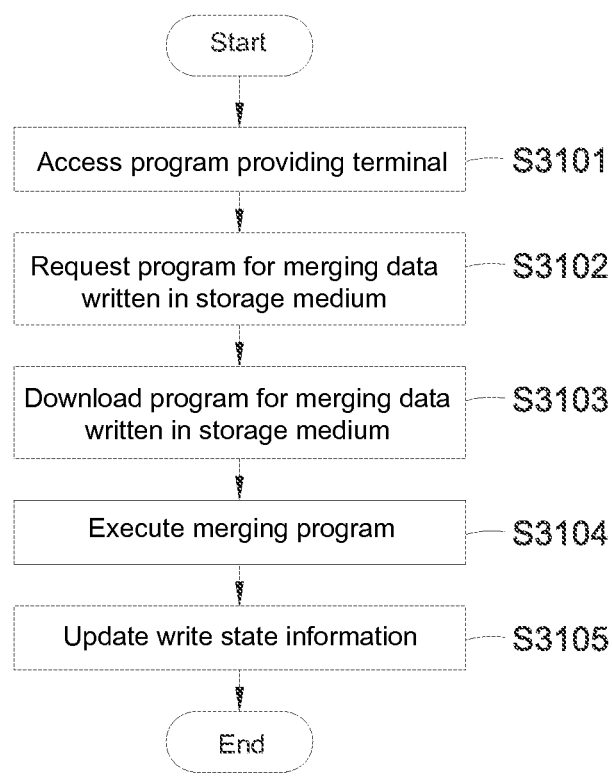
FIG. 31 is a flow chart of a method for merging data written in a storage medium according to another preferred embodiment of the present invention on the basis of the network system illustrated in FIG. 30.

FIG. 31 is a flow chart of a method for merging data written in a storage medium according to another preferred embodiment of the present invention on the basis of the network system illustrated in FIG. 30.

With reference to FIG. 31, after accessing the program providing terminal 3001, the host PC 3003 transmits information for requesting the program for merging data written on the storage medium 124 or the disk 12 to the program providing terminal 3001 (S3101, S3102).

The program providing terminal 3001 transmits the requested program for merge processing to the host PC 3003, so that the host PC 3003 downloads the program for merge processing (S3103).

The host PC 3003 processes the downloaded merge program to execute it in the storage device 3004 (S3104). When the program for merge processing is executed in the storage device 3004, valid data written in an area to be merged of the storage medium 124 or the disk 12 is moved to a free area of the storage medium 124 or the disk 12 as described above with reference to FIGS. 14 to 17.

When the valid data written in the area to be merged of the storage medium 124 or the disk 12 is entirely moved to the free area of the storage medium 124 or the disk 12, the storage device 3104 updates write state information including address mapping information of the source area and the free area of the storage medium 124 or the disk 12 (S3105).

Through the foregoing operation, the merge operation with respect to the storage medium can be controlled through the wired or wireless network.

The method for controlling a write operation on a storage medium according to a preferred embodiment of the present invention may be processed in the same order as that of FIG. 31.

An embodiment may include a method for merging data written in a storage medium comprising the steps of: selecting one of physical address-based merge operation and logical address-based merge operation on the basis of write state information regarding a source area of a storage medium; reading data from the source area by using any one of physical addresses and logical addresses included in address mapping information of the source area according to the selected merge operation; and writing the read data to a destination area of the storage medium. An embodiment may also include, wherein the step of reading data comprises the steps of: when the selected merge operation is the physical address-based merge operation, controlling the read operation on the source area on the basis of physical addresses included in the address mapping information of the source area; and when the selected merge operation is the logical address-based merge operation, controlling the read operation on the source area on the basis of logical addresses included in the address mapping information of the source area. An embodiment may also include setting the source area as a free area after the read data is written to the destination area. An embodiment may also include wherein the write state information comprises the number of address mapping information items obtained by mapping physical addresses of the source area and logical addresses received when data is written to the source area, and the step of selecting a merge operation comprises the steps of: when the number of address mapping information items is greater than a threshold value, selecting the physical address-based merge operation; and when the number of address mapping information items is not greater than the threshold value, selecting the logical address-based merge operation. An embodiment may also include wherein the threshold value is set according to at least one of the size of the source area and the number of sectors included in the source area. An embodiment may also include, wherein the step of reading data comprises the steps of: when the selected merge operation is the physical address-based merge operation, controlling the read operation on the source area on the basis of physical addresses included in the address mapping information of the source area; and when the selected merge operation is the logical address-based merge operation, controlling the read operation on the source area on the basis of logical addresses included in the address mapping information of the source area. An embodiment may also include wherein the write state information comprises the number of address mapping information items obtained by mapping the physical addresses of the source area and the logical addresses when data is written to the source area and the number of sectors in which valid data is written in the source area, and the step of selecting a merge operation comprises the steps of: when the number of address mapping information items is greater than a first threshold value or when a value obtained by dividing the number of the sectors in which the valid data is written in the source area by the number of the address mapping information items is greater than a second threshold value, selecting the physical address-based merge operation; and when the number of the address mapping information items with respect to the source area is not greater than the first threshold value and when the value obtained by dividing the number of the sectors in which the valid data is written in the source area by the number of the address mapping information items is not greater than a second threshold value, selecting the logical address-based merge operation.

An embodiment may also include, wherein the first threshold value and the second threshold value are set according to at least one of the size of the source area and the number of sectors included in the source area. An embodiment may also include wherein the step of reading data comprises the steps of: when the selected merge operation is the physical address-based merge operation, controlling the read operation on the source area on the basis of physical addresses included in the address mapping information of the source area; and when the selected merge operation is the logical address-based merge operation, controlling the read operation on the source area on the basis of logical addresses included in the address mapping information of the source area. An embodiment may also include, wherein the write state information comprises the number of address mapping information items obtained by mapping the physical addresses of the source area and the logical addresses received when data is written to the source area and the number of sectors in which valid data is written in the source area, and the step of selecting a merge operation comprises the steps of: when a value obtained by the number of sectors in which valid data is written in the source area by the number of the address mapping information items is greater than a threshold value, selecting the physical address-based merge operation; and when the value obtained by the number of sectors in which valid data is written in the source area by the number of the address mapping information items is not greater than a threshold value, selecting the logical address-based merge operation. An embodiment may also include, wherein the threshold value is set according to at least one of the size of the source area and the number of sectors included in the source area. An embodiment may also include wherein the step of reading data comprises the steps of: when the selected merge operation is the physical address-based merge operation, controlling the read operation on the source area on the basis of physical addresses included in the address mapping information of the source area; and when the selected merge operation is the logical address-based merge operation, controlling the read operation on the source area on the basis of logical addresses included in the address mapping information of the source area. An embodiment may also include, wherein the merging method is performed when a storage device having the storage medium is in an idle state or when a write-available area is insufficient in the storage medium when the storage device receives a write command. An embodiment may also include, further comprising the steps of: selecting the source area on the basis of information registered to a merge queue included in the storage device having the storage medium; and selecting the destination area on the basis of information registered to a free queue included in the storage device having the storage medium. An embodiment may also include wherein, in the storage medium, data is sequentially written in one direction while being overlapped in a partial area of a previous track.

Another embodiment may be a method for merging data written in a storage medium, comprising the steps of: reading data from a source area of a storage medium on the basis of logical addresses included in address mapping information regarding the source area; and writing the read data to a destination area of the storage medium.

Another embodiment may be a method for merging data written in a storage medium, comprising the steps of: generating a driving signal for moving a magnetic head to a source area by using any one of physical addresses and logical addresses included in address mapping information of the source area according to a merge operation selected on the basis of information regarding a written state of the source area to be merged in a disk; reading data from a physical position of the source area of the disk to which the magnetic had has been moved according to the driving signal; generating a driving signal for moving the magnetic head to a physical position of a destination area of the disk; and sequentially writing the data read from the source area to the destination area to which the magnetic head has been moved according to the driving signal. An embodiment may also include wherein the write state information comprises the number of address mapping information items of the source area, and the address mapping information is information obtained by mapping physical addresses of the source area and logical addresses received when data is written in the source area. An embodiment may also include wherein when the number of the address mapping information items is greater than a threshold value, the selected merge operation is physical address-based merge operation, and when the number of the address mapping information items is not greater than a threshold value, the selected merge operation is logical address-based merge operation. An embodiment may also include wherein the write state information further comprises a number of sectors in which valid data is written in the source area, and when a value obtained by dividing the number of the sectors in which the valid data is written by the number of the address mapping information items is greater than a threshold value, the selected merge operation is physical address-based merge operation, and when the value obtained by dividing the number of the sectors in which the valid data is written by the number of the address mapping information items is not greater than a threshold value, the selected merge operation is logical address-based merge operation. An embodiment may also include wherein the write state information further comprises the number of sectors in which valid data is written in the source area, and when the number of address mapping information items is greater than a first threshold value or when a value obtained by dividing the number of the sectors in which the valid data is written in the source area by the number of the address mapping information items is greater than a second threshold value, the selected merge operation is physical address-based merge operation, and when the number of address mapping information items is not greater than a first threshold value or when a value obtained by dividing the number of the sectors in which the valid data is written in the source area by the number of the address mapping information items is not greater than the second threshold value, the selected merge operation is logical address-based merge operation. An embodiment may also include wherein, in the step of generating the driving signal for moving the magnetic head to the source area, when the selected merge operation is physical address-based merge operation, a driving signal for moving the magnetic head is generated by using the physical addresses included in the address mapping information of the source area, and when the selected merge operation is logical address-based merge operation, a driving signal for moving the magnetic head is generated by using the logical addresses included in the address mapping information of the source area.

Another embodiment may be a method for controlling a write operation on a storage medium, comprising the steps of: when a write command is received, if a write-available area of the storage medium is insufficient, selecting one of physical address-based merge operation and logical address-based merge operation on the basis of write state information regarding a source area to be merged in the storage medium; reading data from the source area by using any one of physical addresses and logical addresses included in address mapping information of the source area according to the selected merge operation; and writing the read data to a destination area of the storage medium. An embodiment may also include wherein the step of writing the read data to the destination area of the storage medium comprises the step of: performing a write operation according to the write command. An embodiment may also include wherein the step of reading data comprises the steps of: when the selected merge operation is the physical address-based merge operation, controlling the read operation on the source area on the basis of physical addresses included in the address mapping information of the source area; and when the selected merge operation is the logical address-based merge operation, controlling the read operation on the source area on the basis of logical addresses included in the address mapping information of the source area. An embodiment may also include wherein the write state information comprises the number of address mapping information items, and the step of selecting a merge operation comprises the steps of: when the number of address mapping information items is greater than a threshold value, selecting the physical address-based merge operation; and when the number of address mapping information items is not greater than the threshold value, selecting the logical address-based merge operation. An embodiment may also include wherein the threshold value is set according to at least one of the size of the source area and the number of sectors included in the source area. An embodiment may also include wherein the write state information comprises the number of address mapping information items and the number of sectors in which valid data is written in the source area, and the step of selecting a merge operation comprises the steps of: when the number of address mapping information items is greater than a first threshold value or when a value obtained by dividing the number of the sectors in which the valid data is written in the source area by the number of the address mapping information items is greater than a second threshold value, selecting the physical address-based merge operation; and when the number of the address mapping information items is not greater than the first threshold value and when the value obtained by dividing the number of the sectors in which the valid data is written in the source area by the number of the address mapping information items is not greater than a second threshold value, selecting the logical address-based merge operation. An embodiment may also include wherein the first threshold value and the second threshold value are set according to at least one of the size of the source area and the number of sectors included in the source area. An embodiment may also include wherein the write state information comprises the number of address mapping information items and the number of sectors in which valid data is written in the source area, and the step of selecting a merge operation comprises the steps of: when a value obtained by the number of sectors in which valid data is written in the source area by the number of the address mapping information items is greater than a threshold value, selecting the physical address-based merge operation; and when the value obtained by the number of sectors in which valid data is written in the source area by the number of the address mapping information items is not greater than a threshold value, selecting the logical address-based merge operation. An embodiment may also include wherein the threshold value is set according to at least one of the size of the source area and the number of sectors included in the source area. An embodiment may also include further comprising the steps of: selecting the source area on the basis of information registered to a merge queue included in the storage device having the storage medium; and selecting the destination area on the basis of information registered to a free queue included in the storage device. An embodiment may also include wherein, in the storage medium, data is sequentially written in one direction while being overlapped in a partial area of a previous track.

Another embodiment may be a storage device comprising: a storage medium storing data; and a processor reading data from a source area by using one of physical addresses and logical addresses included in address mapping information of the source area to be merged in the storage medium, and writing the read data to a destination area of the storage medium, wherein the processor selects one of physical address-based merge operation and logical address-based merge operation on the basis of write state information regarding the source area. An embodiment may also include wherein the processor comprises: a merge operation selecting unit selecting the merge operation on the basis of the write state information and a threshold value; a data read and write operation controller reading data from the source area according to the selected merge operation and writing the read data to the destination area; and a write state information updating unit updating write state information regarding the source area and the destination area when the write operation on the destination area is completed. An embodiment may also include wherein when the selected merge operation is the physical address-based merge operation, the data read and write operation controller controls the read operation on the source area on the basis of physical addresses included in address mapping information of the source area, and when the selected merge operation is the logical address-based merge operation, the data read and write operation controller controls the read operation on the source area on the basis of logical addresses included in address mapping information of the source area. An embodiment may also include wherein the write state information comprises the number of address mapping information items of the source area and the threshold value is set according to at least one of the size of the source area and the number of sectors included in the source area, and when the number of address mapping information items of the source area is greater than the threshold value, the merge operation selecting unit selects the physical address-based merge operation, and when the number of address mapping information items of the source area is not greater than the threshold value, the merge operation selecting unit selects the logical address-based merge operation. An embodiment may also include wherein the write state information comprises the number of address mapping information items of the source area and the number of sectors in which valid data is written in the source area, the threshold value comprises first and second threshold values, and the first threshold value and the second threshold value are set according to at least one of the size of the source area and the number of sectors included in the source area, and when the number of address mapping information items of the source area is greater than a first threshold value or when a value obtained by dividing the number of the sectors in which the valid data is written in the source area by the number of the address mapping information items is greater than a second threshold value, the merge operation selecting unit selects the physical address-based merge operation, and when the number of address mapping information items of the source area is greater than a first threshold value and when a value obtained by dividing the number of the sectors in which the valid data is written in the source area by the number of the address mapping information items is greater than a second threshold value, the merge operation selecting unit selects the logical address-based merge operation. An embodiment may also include wherein the write state information comprises the number of address mapping information items of the source area and the number of sectors in which valid data is written in the source area, the threshold value is set according to at least one of the size of the source area and the number of sectors of the source area, and when the value obtained by dividing the number of the sectors in which the valid data is written by the number of the address mapping information items of the source area is greater than the threshold value, the merge operation selecting unit selects the physical address-based merge operation, and when the value obtained by dividing the number of the sectors in which the valid data is written by the number of the address mapping information items of the source area is not greater than the threshold value, the merge operation selecting unit selects the logical address-based merge operation. An embodiment may also include wherein the processor further comprises: a merge queue to which information regarding a merge standby area of the storage medium has been registered, and a free queue to which information regarding a free area of the storage medium has been registered, and when the selected merge operation information is received from the merge operation selecting unit, the data read and write operation controller controls the read operation and write operation on the basis of identification information regarding the merge standby area obtained from the merge queue and identification information regarding the free area obtained from the free queue.

An embodiment may also include wherein the storage device comprises: an idle state determining unit determining whether the storage device is in an idle state according to whether a command is received; a write area checking unit checking whether a write-available area is insufficient in the storage medium when a write command is received; and a merge operation calling unit providing a merge request signal for calling a merge operation to the merge operation selecting unit on the basis of output signals from the idle state determining unit and the write area checking unit. An embodiment may also include wherein the processor comprises: a first processor receiving a command and extracting a logical block address from the received command; a second processor controlling to select a merge operation on the basis of the write state information, read data from the source area by using any one of physical addresses and logical addresses included in address mapping information of the source area according to the selected merge operation, and write the read data to the destination area; and a third processor managing the write state information and controlled by the second processor to read and write the data. An embodiment may also include wherein the second processor comprises a merge queue and a free queue, and manage information regarding the merge standby area and the free area of the storage medium by using the merge queue and the free queue. An embodiment may also include wherein the first processor, the second processor, and the third processor are on the basis of a layer for converting the logical addresses into a virtual address of the storage medium and converting the virtual address into physical addresses of the storage medium.

Another embodiment may be a computer system comprising: a host device outputting a command and data; and a storage device writing data received from the host device to a storage medium or transmitting data read from the storage medium to the host device, wherein the storage device reads data from an area to be merged in the storage medium on the basis of any one of physical addresses and logical addresses included in address mapping information of the area to be merged, and merge written data to the area to be merged. An embodiment may also include wherein the storage device selects one of physical address-based merge operation of reading data from an area to be merged on the basis of the physical addresses and logical addresses based merge operation of reading data from the area to be merged on the basis of the logical addresses according to write state information of the area to be merged. An embodiment may also include wherein the write state information comprises the number of address mapping information items of the area to be merged and when the number of address mapping information items of the source area is greater than the threshold value, the storage device selects the physical address-based merge operation, and when the number of address mapping information items is not greater than the threshold value, the storage device selects the logical address-based merge operation. An embodiment may also include wherein the write state information comprises the number of address mapping information items of the areas to be merged and the number of sectors in which valid data is written in the area to be merged, and when a value obtained by dividing the number of the sectors in which the valid data is written by the number of the address mapping information items is greater than a second threshold value, the storage device selects the physical address-based merge operation, and when a value obtained by dividing the number of the sectors in which the valid data is written by the number of the address mapping information items is not greater than a second threshold value, the storage device selects the logical address-based merge operation. An embodiment may also include wherein the write state information comprises the number of address mapping information items of the area to be merged and the number of sectors in which valid data is written in the area to be merged, and when the number of address mapping information items is greater than a first threshold value or when a value obtained by dividing the number of the sectors in which the valid data is written in the source area by the number of the address mapping information items is greater than a second threshold value, the storage device selects the physical address-based merge operation, and when the number of address mapping information items is not greater than the first threshold value or when a value obtained by dividing the number of the sectors in which the valid data is written in the source area by the number of the address mapping information items is not greater than the second threshold value, the storage device selects the physical address-based merge operation. An embodiment may also include wherein when a write command is received from the host device, if an area for writing data is insufficient in the storage medium or when the storage device is in an idle state, the storage device performs merging.

Another embodiment may be a method for merging data written in a storage medium, the method comprising: downloading a program for merge processing with respect to data written in a storage medium through a network; and executing the program for merge processing in a storage device, wherein the program for merge processing executes of reading data from an area to be merged by using any one of physical addresses and logical addresses included in address mapping information of the area to be merged according to a selected merge operation on the basis of write state information of the area to be merged in the storage medium included in the storage device, and writing the read data to a destination area of the storage medium. An embodiment may also include wherein the write state information comprises the number of address mapping information items and the number of sectors in which valid data is written in the area to be merged.

Another embodiment may be a computer-readable storage medium storing a program for executing a method for merging data written in a storage medium according to any one of the embodiments herein. Another embodiment may be a computer-readable storage medium storing a program for executing a method for controlling a write operation on a storage medium according to any of the embodiments herein.

A program for performing the method for merging data written in a storage medium and the method for controlling a write operation on a storage medium according to embodiments of the present invention may be implemented as computer-readable codes in a computer-readable storage medium. The computer readable recording medium includes ROM, RAM, CD-ROM, magnetic tapes, floppy disks, and optical data storage devices. The computer readable recording medium can also be distributed to network coupled computer systems so that the computer readable codes are stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method comprising:
selecting a first data storage area of a data storage medium based on a quantity of obsolete data in the first data storage area;
selecting a move operation based on address mapping information for the first data storage area, including:
determining a number of valid keys in the address mapping information for the first data storage area, valid keys comprising information on sets of contiguous valid memory spaces including:
a first LBA in a set of contiguous LBAs,
a first physical memory address in a set of contiguous physical memory addresses, the first physical memory address corresponding to the first LBA and the set of contiguous physical memory addresses corresponding to the set of contiguous LBAs,
a number of contiguous valid memory spaces in the valid key;
selecting a physical address-based move operation when the number of valid keys is greater than a first threshold value;
selecting a logical address-based move operation when the number of valid keys is not greater than the first threshold value;
moving the valid data to a second data storage area based on the selected move operation; and
setting memory spaces corresponding to the first data storage area as available memory for storing other data.

2. The method of claim 1, further comprising:
each data storage area comprises sets of contiguous physical memory addresses of the data storage medium;
each data storage area is allocated to logical bands of the data storage medium, logical bands including storage zones for a range of consecutive logical block addresses (LBAs) allocated to physical memory addresses.

3. The method of claim 2, further comprising:
identifying information for data storage areas is stored in a free queue, an allocation queue, and a garbage queue,
the free queue storing identifying information for available data storage areas which can be allocated to logical bands,
the allocation queue storing identifying information for data storage areas currently allocated to logical bands,
the garbage queue storing identifying information for data storage areas currently allocated to logical bands and eligible to be selected as a first data storage area according to the method; and
wherein setting memory spaces corresponding to the first data storage area as available memory for storing other data comprises moving identifying information for the first data storage area from the garbage queue to the free queue and de-allocating the first data storage area from an associated logical band.

4. The method of claim 3, further comprising selecting a first data storage area includes:
determining whether identifying information for a data storage area exists in the garbage queue;
moving identifying information for a data storage area from the allocation queue to the garbage queue based on a recycle analysis when no identifying information exists in the garbage queue, wherein the recycle analysis comprises counting the number of memory spaces containing obsolete data in a data storage area; and
selecting the identifying information of a data storage area from the garbage queue.

5. The method of claim 4, further comprising the recycle analysis further includes selecting identifying information for a data storage area to move from the allocation queue to the garbage queue when the number of memory spaces containing obsolete data in the data storage area exceeds a second threshold.

6. The method of claim 4, further comprising the recycle analysis includes selecting identifying information for a data storage area to move from the allocation queue to the garbage queue by selecting the data storage area in the allocation queue with the highest number of memory spaces containing obsolete data.

7. The method of claim 1, further comprising selecting between the physical address-based move operation and the logical address-based move operation includes:
selecting the physical address-based move operation when the number of memory addresses containing valid data in the first data storage area divided by the number of valid keys in the first data storage address is greater than a second threshold value; and
selecting the logical address-based move operation when the number of memory addresses containing valid data in the first data storage area divided by the number of valid keys in the first data storage address is not greater than the second threshold value.

8. The method of claim 1, further comprising moving the valid data to the second data storage area further includes:
moving the valid keys from the first data storage area to the second data storage area in an order based on the selected physical address-based move operation or logical address-based move operation,
wherein the physical address-based move operation comprises reading the valid keys from the first data storage area and writing the valid keys to the second data storage area in order based on the first physical memory address of the valid keys; and
wherein the logical address-based move operation comprises reading the valid keys from the first data storage area and writing the valid keys to the second data storage area in order based on the first LBA of the valid keys.

9. An apparatus comprising:
a data storage device including:
a processor configured to:
select a first data storage area of the storage medium based on a quantity of obsolete data in the first data storage area, the first data storage area having first valid data;
move the first valid data to a second data storage area by selecting a physical address-based move operation when the number of valid keys in the first data storage area is greater than a first threshold value, valid keys comprising information on sets of contiguous valid memory sectors including:
a first LBA in a set of contiguous LBAs;
a first physical memory address in a set of contiguous physical memory addresses, the first physical memory address corresponding to the first LBA and the set of contiguous physical memory addresses corresponding to the set of contiguous LBAs;
a number of contiguous valid memory spaces in the valid key;
select the logical address-based move operation when the number of valid keys in the first data storage area is not greater than the first threshold value; and
set memory sectors corresponding to the first data storage area as available memory for storing other data.

10. The apparatus of claim 9, further comprising each data storage area includes sets of contiguous physical memory addresses of the storage medium; and
data is defined by logical block addresses (LBAs), LBAs being allocated to physical memory addresses.

11. The apparatus of claim 10, further comprising the processor is configured to select a first data storage area by selecting a data storage area from a set of data storage areas when the number of memory sectors containing obsolete data in the data storage area either exceeds a second threshold or exceeds the number of memory sectors containing obsolete data in the other data storage areas in the set of data storage areas.

12. The apparatus of claim 9, further comprising the processor is further configured to:
move the valid keys of the first valid data to a second data storage area in an order based on the selected physical address-based move operation or logical address-based move operation;
the physical address-based move operation includes reading the valid keys from the first data storage area and writing the valid keys to the second data storage area in order based on the first physical memory address of the valid keys; and
the logical address-based move operation includes reading the valid keys from the first data storage area and writing the valid keys to the second data storage area in order based on the first LBA of the valid keys.

13. An apparatus comprising:
a controller configured to:
select a first data storage area of a data storage medium based on a quantity of obsolete data in the first data storage area;
select between a physical address-based move operation and a logical address-based move operation based on valid keys in the address mapping information for the first data storage area, valid keys having information on sets of contiguous valid memory sectors, including:
a first LBA in a set of contiguous LBAs,
a first physical memory address in a set of contiguous physical memory addresses, the first physical memory address corresponding to the first LBA and the set of contiguous physical memory addresses corresponding to the set of contiguous LBAs,
a number of contiguous valid memory spaces in the valid key;
select the physical address-based move operation when the number of memory addresses containing valid data in the first data storage area divided by the number of valid keys in the first data storage address is greater than a threshold value;
select the logical address-based move operation when the number of memory addresses containing valid data in the first data storage area divided by the number of valid keys in the first data storage address is not greater than the threshold value;
move valid data from the first data storage area to a second data storage area; and
set memory sectors corresponding to the first data storage area as available memory for storing other data.

14. The apparatus of claim 13, further comprising each data storage area comprises sets of contiguous physical memory addresses of the data storage medium, and logical block addresses (LBAs) are allocated to physical memory addresses.

15. The apparatus of claim 14, further comprising the controller is configured to:
move the valid keys of the first valid data to a second data storage area in an order based on the selected physical address-based move operation or logical address-based move operation,
the physical address-based move operation includes reading the valid keys from the first data storage area and writing the valid keys to the second data storage area in order based on the first physical memory address of the valid keys; and
the logical address-based move operation includes reading the valid keys from the first data storage area and writing the valid keys to the second data storage area in order based on the first LBA of the valid keys.

16. The apparatus of claim 13, further comprising the data storage medium is a disc storage medium, and data is recorded to the data storage medium in a shingled manner, the shingled manner including data recorded to a first track of the disc storage medium is partially overwritten by data recorded to a second track of the disc storage medium and data cannot be written to the first track once data has been written to the second track without a partial overwriting of the second track.

17. The method of claim 1 further comprising:
the first data storage area is recorded in a shingled manner where data recorded to a first track is partially overwritten by data recorded to a second track.

18. The apparatus of claim 9, the data storage device further comprising:
a storage medium including a disc memory having data recorded in a shingled manner where data recorded to a first track is partially overwritten by data recorded to a second track.

* * * * *